(12) United States Patent
Jones et al.

(10) Patent No.: US 11,644,671 B2
(45) Date of Patent: May 9, 2023

(54) LARGE EXIT PUPIL WEARABLE NEAR-TO-EYE VISION SYSTEMS EXPLOITING FREEFORM EYEPIECES

(71) Applicant: ESIGHT CORP., Kanata (CA)

(72) Inventors: Frank Jones, Ottawa (CA); James Benson Bacque, Ottawa (CA); Robert Hilkes, Ottawa (CA); Mehdi Arezoomand Ersdhadi, Ottawa (CA); Mark Harris, Woodlawn (CA); Jon Pawson, Algonquin Highlands (CA)

(73) Assignee: eSight Corp., Ottawa (CA)

( * ) Notice: Subject to any disclaimer, the term of this patent is extended or adjusted under 35 U.S.C. 154(b) by 0 days.

(21) Appl. No.: 16/821,026

(22) Filed: Mar. 17, 2020

(65) Prior Publication Data

US 2020/0225486 A1 Jul. 16, 2020

Related U.S. Application Data

(63) Continuation of application No. 15/676,053, filed on Aug. 14, 2017, now abandoned.

(Continued)

(51) Int. Cl.
*G02B 27/01* (2006.01)
*G06F 1/16* (2006.01)

(52) U.S. Cl.
CPC ......... *G02B 27/0172* (2013.01); *G06F 1/163* (2013.01); *G02B 27/0179* (2013.01);
(Continued)

(58) Field of Classification Search
CPC ............... G02B 27/01; G02B 27/0101; G02B 27/0149; G02B 27/017; G02B 27/0172;
(Continued)

(56) References Cited

U.S. PATENT DOCUMENTS 5,959,780 A * 9/1999 Togino ............... G02B 27/0172
359/633
2011/0248904 A1* 10/2011 Miyawaki ............ H04N 13/344
345/7

(Continued)

FOREIGN PATENT DOCUMENTS

JP 2013200555 A * 10/2013 ............. G02B 27/01

OTHER PUBLICATIONS

"Representation of freeform surfaces suitable for optimization," Akira Yabe, Appl. Opt. 51, 3054-3058 (2012) (Year: 2012).*

*Primary Examiner* — Travis S Fissel
(74) *Attorney, Agent, or Firm* — Rosenberg, Klein & Lee

(57) ABSTRACT

Within applications for Near-to-Eye (NR2I) displays, irrespective of whether they are for short-term, long-term, low vision, augmented reality, etc., there is a conflicting tradeoff between user comfort, ease of attachment, minimizing intrusiveness and aesthetics which must be concurrently balanced with and are often in conflict with providing an optical vision system within the NR2I display that provides the user with a wide field of view and high image resolution whilst also offering a large exit pupil for eye placement with sufficient eye clearance. Embodiments of the invention address these issues and provide a high performance optical system through the design of the optical eyepiece design to overcome these limitations within a bioptic configuration with laterally disposed displays.

11 Claims, 21 Drawing Sheets

Related U.S. Application Data

(60) Provisional application No. 62/374,208, filed on Aug. 12, 2016.

(52) U.S. Cl.
CPC ............... *G02B 2027/0123* (2013.01); *G02B 2027/0178* (2013.01); *G02B 2027/0187* (2013.01)

(58) Field of Classification Search
CPC ............ G02B 27/0176; G02B 27/0173; G02B 27/22–26; G02B 27/24; G06F 1/163
USPC ...................................... 359/13–14, 462–477
See application file for complete search history.

(56) References Cited

U.S. PATENT DOCUMENTS

| | | | | |
|---|---|---|---|---|
| 2013/0182334 A1* | 7/2013 | Sugihara | .............. | G02B 27/017 359/630 |
| 2014/0009845 A1* | 1/2014 | Cheng | .................... | G03B 21/00 359/720 |
| 2014/0300854 A1* | 10/2014 | Fox | .......................... | G02C 1/08 351/47 |
| 2015/0177519 A1* | 6/2015 | Cakmakci | .......... | G02B 27/0172 359/631 |
| 2015/0187115 A1* | 7/2015 | MacDonald | ....... | G02B 27/0172 345/419 |
| 2016/0116979 A1* | 4/2016 | Border | .................. | G06K 9/222 345/156 |
| 2017/0010471 A1* | 1/2017 | Serrano Canovas | .. | G02B 30/34 |

* cited by examiner

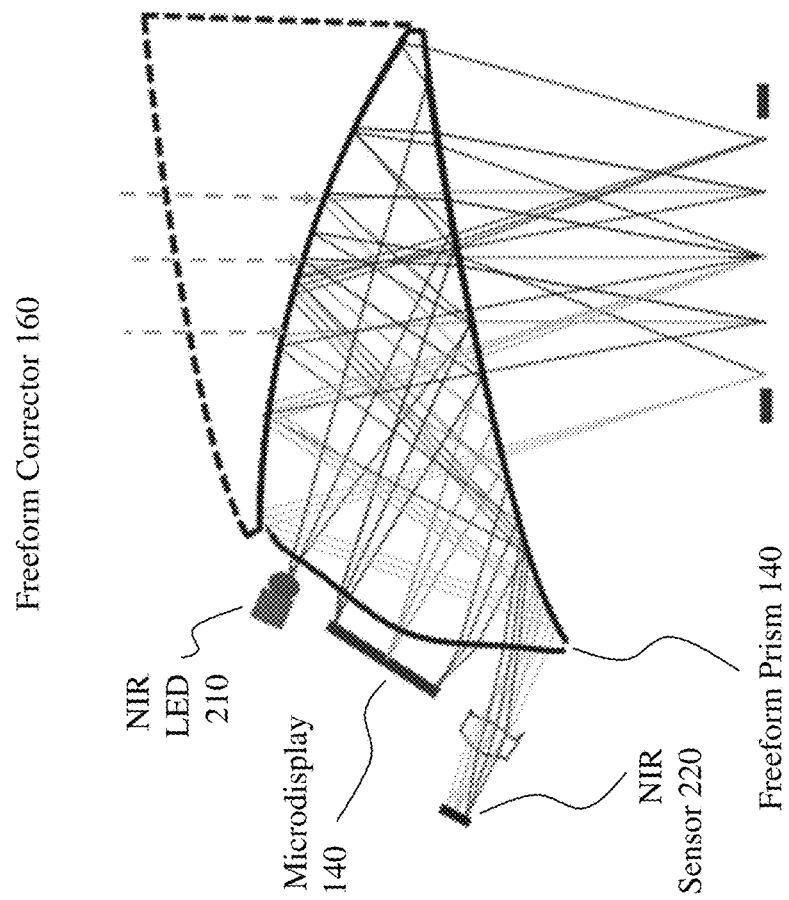
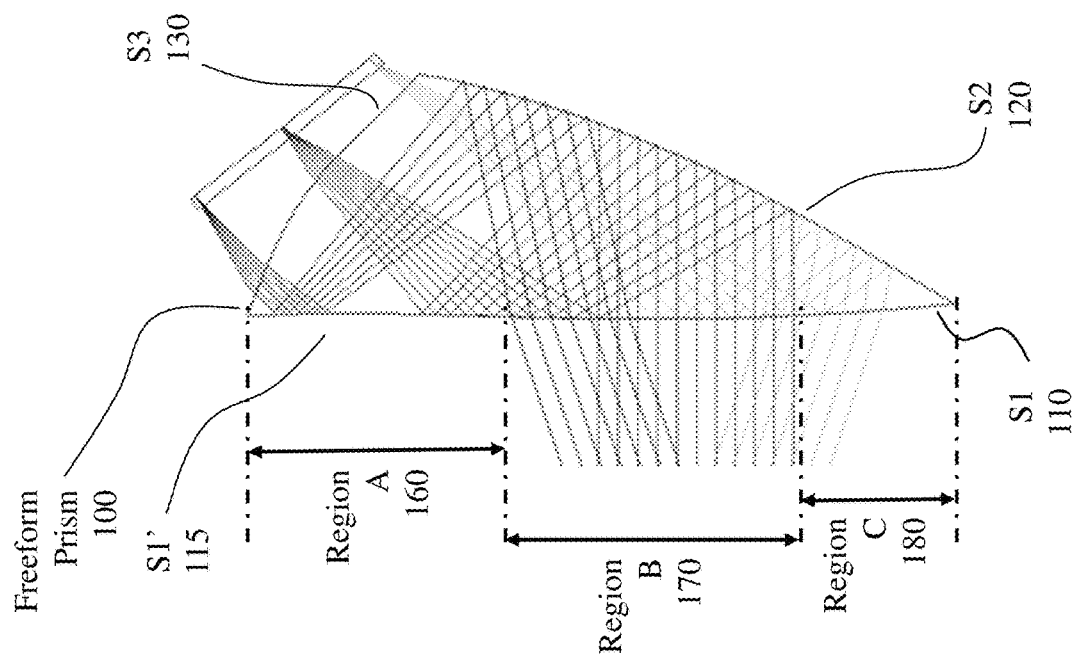
Figure 3
Figure 2

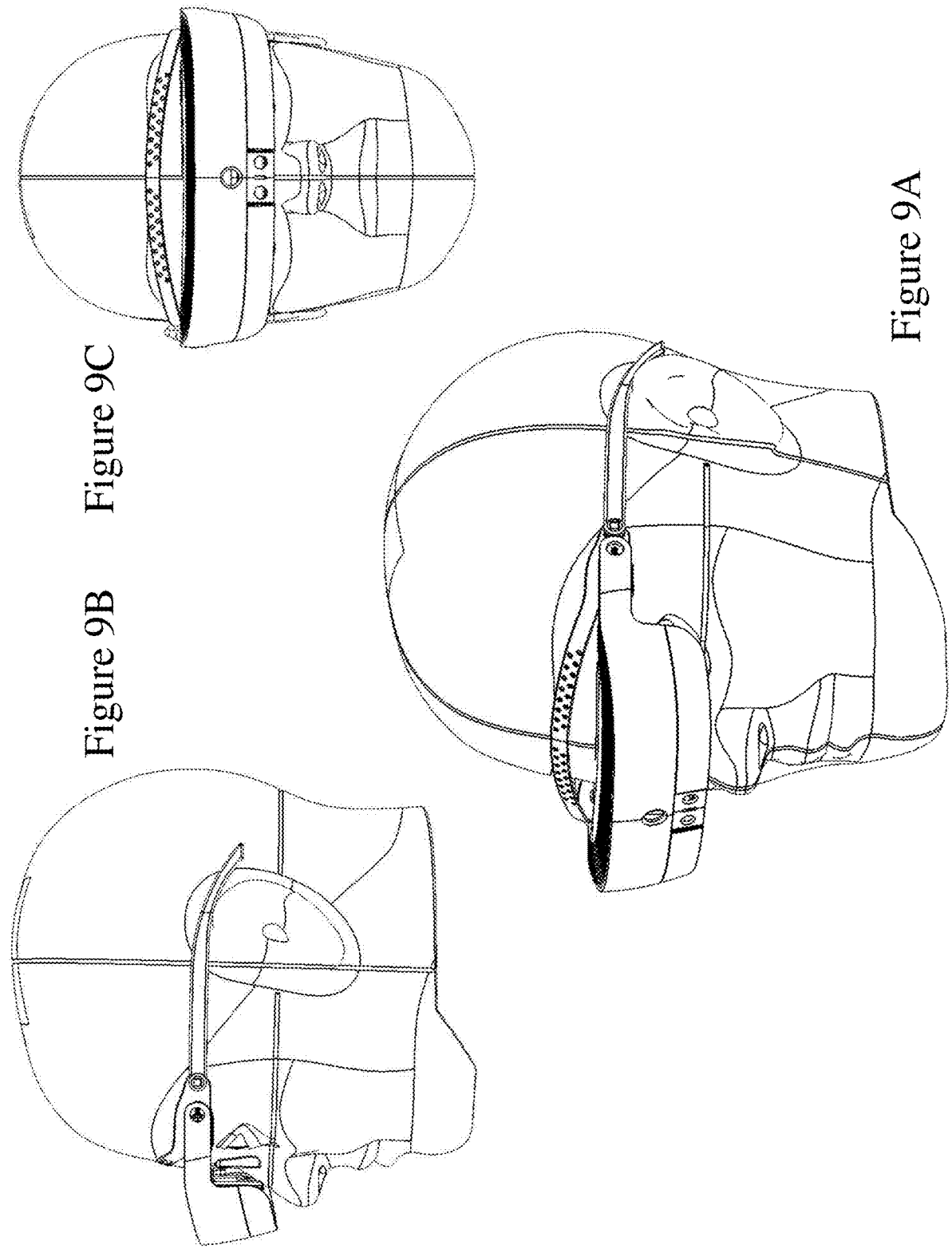

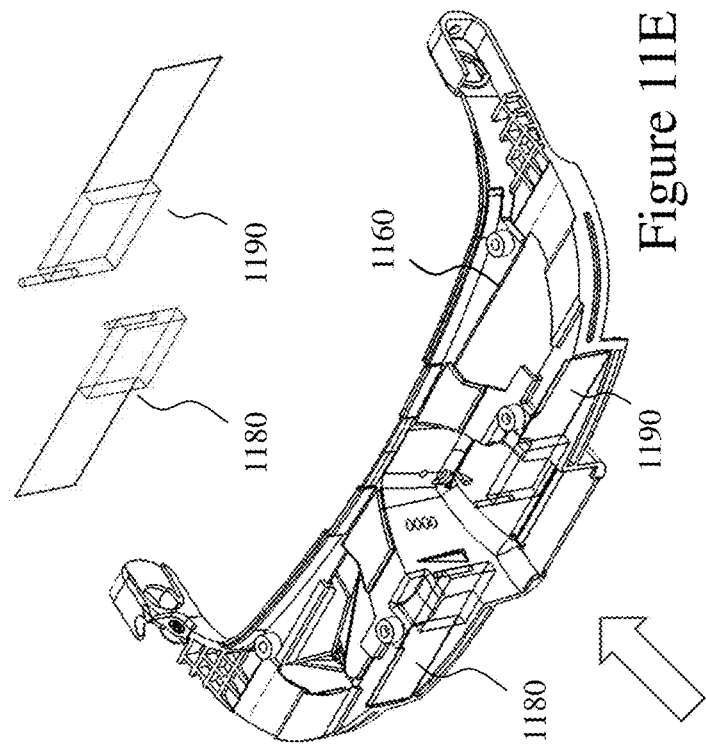
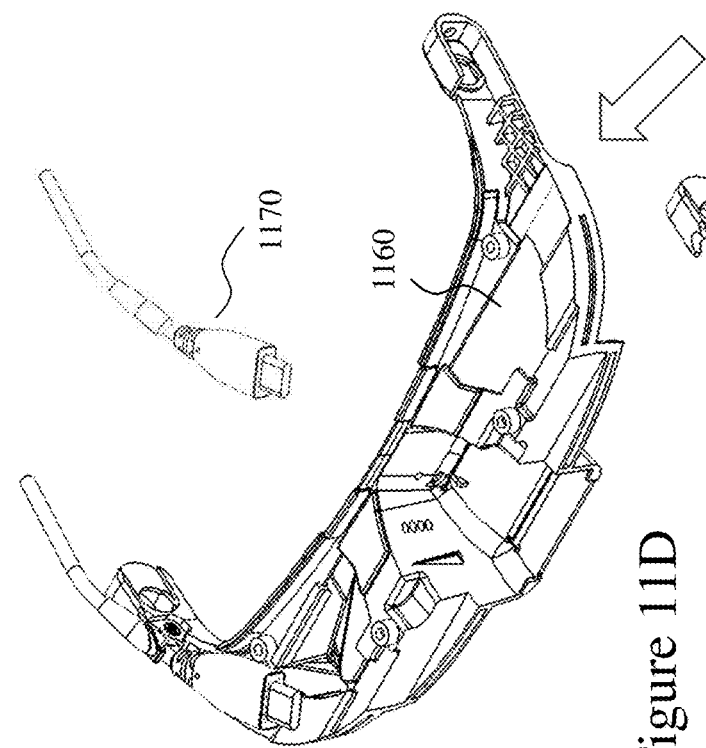
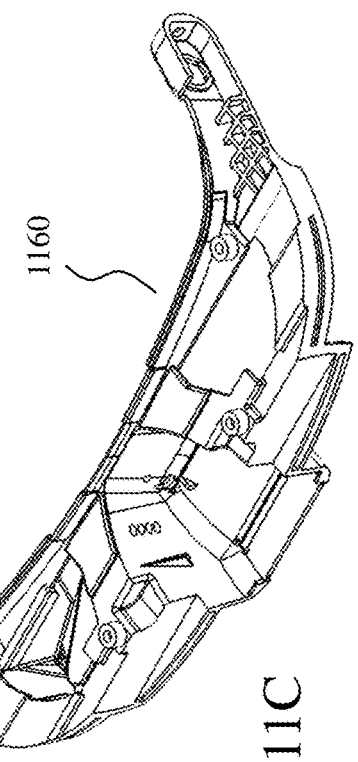
Figure 11E
Figure 11D
Figure 11C

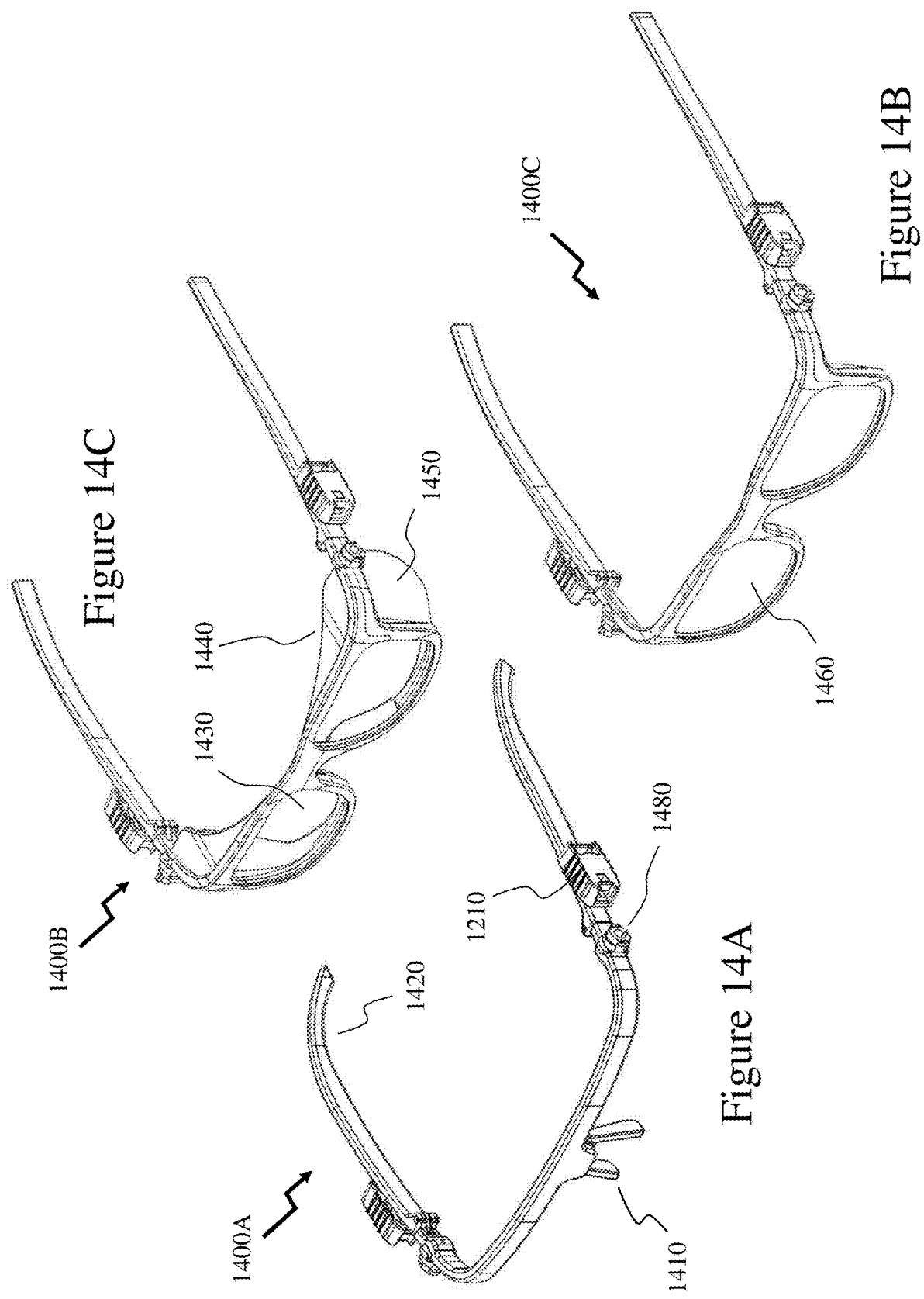

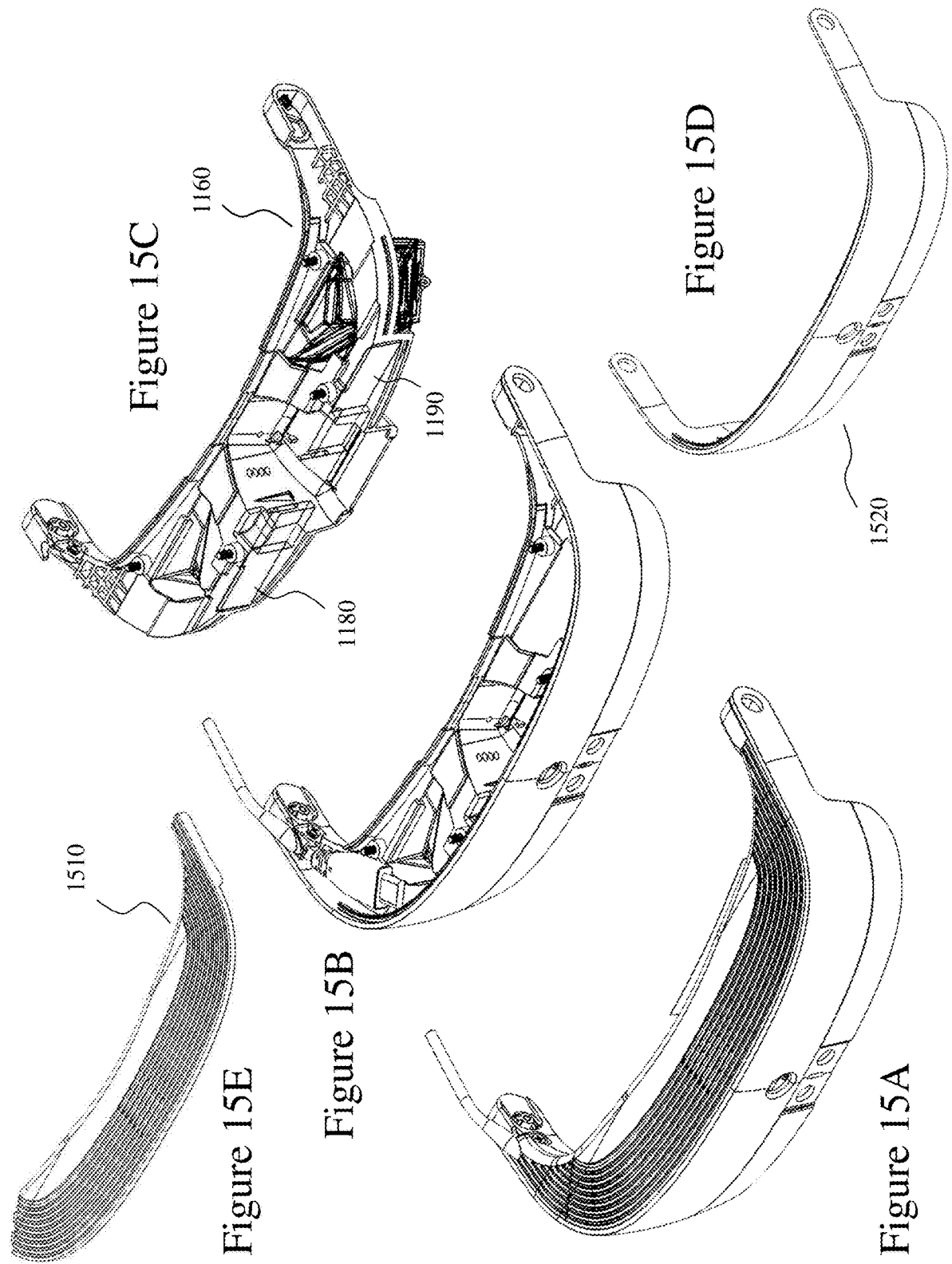

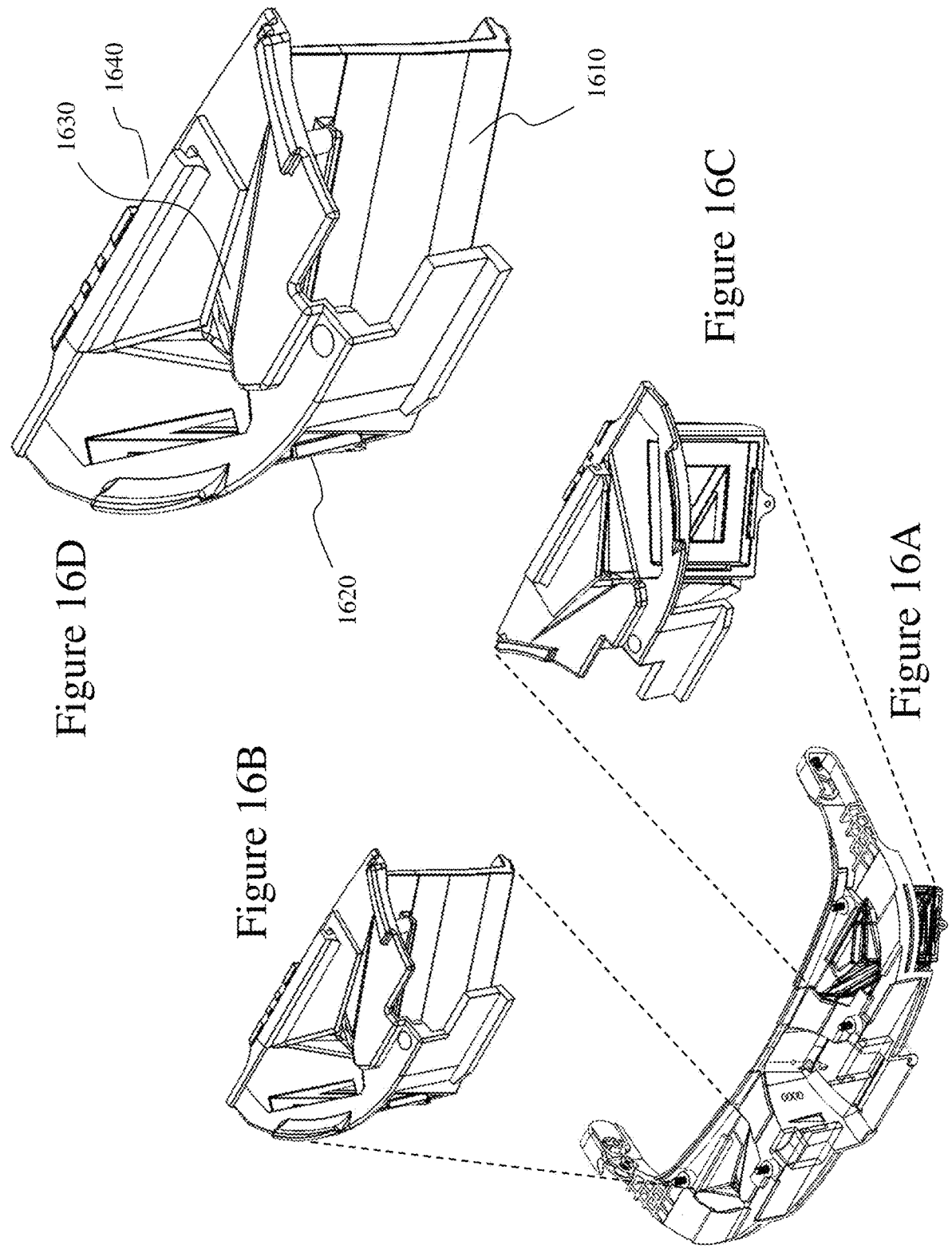

```
//Without dynamic IPD adjust, but performing separate distortion maps for R, G, B
// to allow for digital pre-compensation of chromatic aberration
uniform sampler2D uSampler;
in vec2 vTexCoordRed;
in vec2 vTexCoordGreen;
in vec2 vTexCoordBlue;
out vec4 Color;
void main() {
Color.r = texture(uSampler, vTexCoordRed).r;
Color.g = texture(uSampler, vTexCoordGreen).g;
Color.b = texture(uSampler, vTexCoordBlue).b;
Color.a = 1.0;
};
```

Figure 21A

```
//With dynamic IPD adjust, and also performing separate distortion maps for R, G, B
// to allow for digital pre-compensation of chromatic aberration
uniform sampler2D uSampler;
uniform float uXShift;
in vec2 vTexCoordRed;
in vec2 vTexCoordGreen;
in vec2 vTexCoordBlue;
out vec4 Color;
void main() {
if(vTexCoordRed.x+uXShift > 0.0f && vTexCoordRed.x+uXShift < 1.0f ){
Color.r = texture(uSampler, vTexCoordRed + vec2(uXShift,0.0f)).r;
Color.g = texture(uSampler, vTexCoordGreen + vec2(uXShift,0.0f)).g;
Color.b = texture(uSampler, vTexCoordBlue + vec2(uXShift,0.0f)).b;
Color.a = 1.0;
}else{
Color = vec4(0.0f,0.0f,0.0f,1.0f);
}
};
```

Figure 21B

LARGE EXIT PUPIL WEARABLE NEAR-TO-EYE VISION SYSTEMS EXPLOITING FREEFORM EYEPIECES

CROSS-REFERENCE TO RELATED APPLICATIONS

This patent application claims the benefit of priority as a continuation of U.S. patent application Ser. No. 15/676,053 filed on Aug. 14, 2017 entitled "Large Exit Pupil Wearable Near-to-Eye Vision Systems Exploiting Freeform Eyepieces" which itself claims the benefit of priority from U.S. Provisional Patent Application 62/374,208 filed on Aug. 12, 2016 entitled "Large Exit Pupil Wearable Near-to-Eye Vision Systems Exploiting Freeform Eyepieces", the entire contents of which are incorporated herein by reference.

FIELD OF THE INVENTION

This invention relates to wearable NR2I vision systems and more particularly to providing wearable NR2I vision systems with wide field of view, high image resolution, large exit pupil for eye placement, sufficient eye clearance, and elegant ergonomic design.

BACKGROUND OF THE INVENTION

Wearable near-to-eye (NR2I) vision systems or NR2I displays are a class of wearable device that creates a display in front of the user's field of vision from an electronic display. The display may be transparent such that the viewer can view the external world and the projected electronic display simultaneously or opaque wherein the viewer may directly view the electronic display or a projected electronic display, depending on the application. For example, a transparent display can overlay information and graphics on top on the real world, while an opaque display can provide an immersive theater-like experience. Further NR2I displays may provide information within the full visual field of view of the user or may alternatively provide information within part of the user's field of view.

NR2I displays can be broadly placed in two categories, immersive and see-through. Immersive NR2I displays block a user's view of the real world and create a large field of view image, typically 30°-60° for cinema glasses and 90° or more for virtual reality displays. See-through NR2I displays leave the user's view of the real world open and create either a transparent image or a very small opaque image that blocks only a small portion of the user's peripheral vision. The see-through category can be further broken down into two applications, augmented reality and smart glasses. Augmented reality headsets typically offer 20°-60° fields of view and overlay information and graphics on top of the user's view of the real world. Smart glasses, which is really a misnomer, in contrast typically have a smaller field of view and a display which the user glances at periodically rather than looking through the display continuously.

For users exploiting NR2I displays for augmented reality and/or correction of low vision, then the user is typically, either going to wear the NR2I displays for specific tasks, for specific visual environments, etc. and hence there is an issue of repeatedly attaching and removing the NR2I display or they are going to be wearing the NR2I display for extended periods of time, potentially all their time awake. Accordingly, the majority of applications irrespective of whether they are for short-term, long-term, low vision, augmented reality, etc. yield a conflicting tradeoff between user comfort, ease of attachment, minimizing intrusiveness and aesthetics which must be concurrently balanced with and are often in conflict with providing an optical vision system within the NR2I display that provides the user with a wide field of view and high image resolution whilst also offering a large exit pupil for eye placement with sufficient eye clearance. Accordingly, it would be beneficial to provide NR2I systems that address these issues and provide a high performance optical system within an advance in the field of head-mounted displays and NR2I systems to provide an eyepiece design which overcomes these limitations.

Other aspects and features of the present invention will become apparent to those ordinarily skilled in the art upon review of the following description of specific embodiments of the invention in conjunction with the accompanying figures.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to wearable NR2I vision systems and more particularly to provide wearable NR2I vision systems with wide field of view, high image resolution, large exit pupil for eye placement, sufficient eye clearance, and elegant ergonomic design.

In accordance with an embodiment of the invention there is provided a near-to-eye (NR2I) display system comprising an assembly comprising a free-form prism lens, a microdisplay for projecting image-light onto a region of a first surface of said freeform prism-lens, said image light performing two internal reflections within the free-form prism-lens before exiting the free-form prism-lens for viewing by the user with an eye, wherein the microdisplay is fixedly held in position by said assembly relative to said first surface of the free-form prism lens and proximate a temple of the user nearest the user's eye viewing the projected image-light, such assembly having attachment features such that lateral motion of the assembly across the user's horizontal field of view when attached to a body of the NR2I system is made possible.

In accordance with an embodiment of the invention there is a provided near-to-eye (NR2I) display system further comprises a second assembly comprising a second free-form prism lens, a second microdisplay for projecting image-light onto a predetermined region of a first surface of said second freeform prism-lens, said image light performing two internal reflections within the second freeform prism-lens before exiting the second freeform prism-lens for viewing by the user with their other eye, wherein the second microdisplay is fixedly held in position relative to said first surface of the second free-form prism lens and proximate the user's other temple by said second assembly, such assembly having attachment features such that lateral motion of the second assembly across the user's horizontal field of view when attached to the body of the NR2I system is made possible allowing the positions and separation of the assembly and second assembly to be established in dependence upon the positions and the inter-pupil distance of the user's eyes.

In accordance with an embodiment of the invention there is provided a near-to-eye (NR2I) display system comprising an assembly comprising a free-form prism lens and a microdisplay for projecting image-light onto a predetermined region of a first surface of said freeform prism-lens, said image light performing two internal reflections within the free-form prism-lens before exiting the free-form prism-lens for viewing by the user with an eye, wherein the microdisplay is fixedly held in position by said assembly relative to said first surface of the free-form prism lens and proximate a temple of the user nearest the user's eye viewing the projected image-light, such assembly having attachment features such that vertical angular motion of the assembly across the user's vertical field of view when attached to a body of the NR2I system is made possible, in order to allow positioning of the display above the user's line of sight.

In accordance with an embodiment of the invention there is provided a near-to-eye (NR2I) display system comprising an assembly comprising a free-form prism lens and a microdisplay for projecting image-light onto a first surface of said freeform prism-lens, said image light projecting onto a second surface of said freeform prism-lens performing a first internal reflection to a third surface of the freeform prism-lens, a second internal reflection from the third surface towards a predetermined region of the second surface whereupon the light exits the freeform prism-lens towards the user's eye through said predetermined region; wherein external light is prevented from entering substantially all the second surface excluding said predetermined region through at least one of an applied coating to the second surface of the freeform prism-lens and opaque structures external to the freeform prism-lens.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2 depicts the sub-divisions of surface S1 of the freeform prism-lens according to an embodiment of the invention depicted in FIG. 1B with respect to total internal reflection (TIR) and transmission of optical image from the microdisplay;

FIG. 3 depicts schematically eye tracking applied to a freeform prism-lens such as depicted in FIGS. 1A, 1B and 2 respectively;

FIGS. 9A to 9C respectively depict a bioptic immersive NR2I system according to an embodiment of the invention exploiting a NR2I freeform prism-lens according to an embodiment of the invention wherein the user has pivoted the NR2I system down in front of their eyes;

FIG. 11C to 11E depict provisioning of wired and wireless interface options with a common display shell for a bioptic immersive NR2I system according to an embodiment of the invention;

FIGS. 14A to 14C depict lensless, lensed, and lensed baffled frames, respectively, for supporting a demountable pivotable NR2I display according to an embodiment of the invention;

FIGS. 15A to 15E a NR2I display such as employed within the NR2I systems depicted in FIGS. 9A to 13B sequentially separated to a subset of its constituent parts;

FIGS. 16A to 16D depict the main sub-frame and the Prism Optical Display (POD) (POD) sub-assemblies sequentially separated and in isolation;

FIG. 21A presents an example of an OpenGL code snippet for performing independent texture mapping for the red, green, and blue components to effect chromatic aberration correction according to an embodiment of the invention;

FIG. 21B presents an example of an OpenGL code snippet for performing both chromatic aberration correction and dynamic inter-pupil-distance image control according to an embodiment of the invention;

DETAILED DESCRIPTION

Figures 1A, 1B:
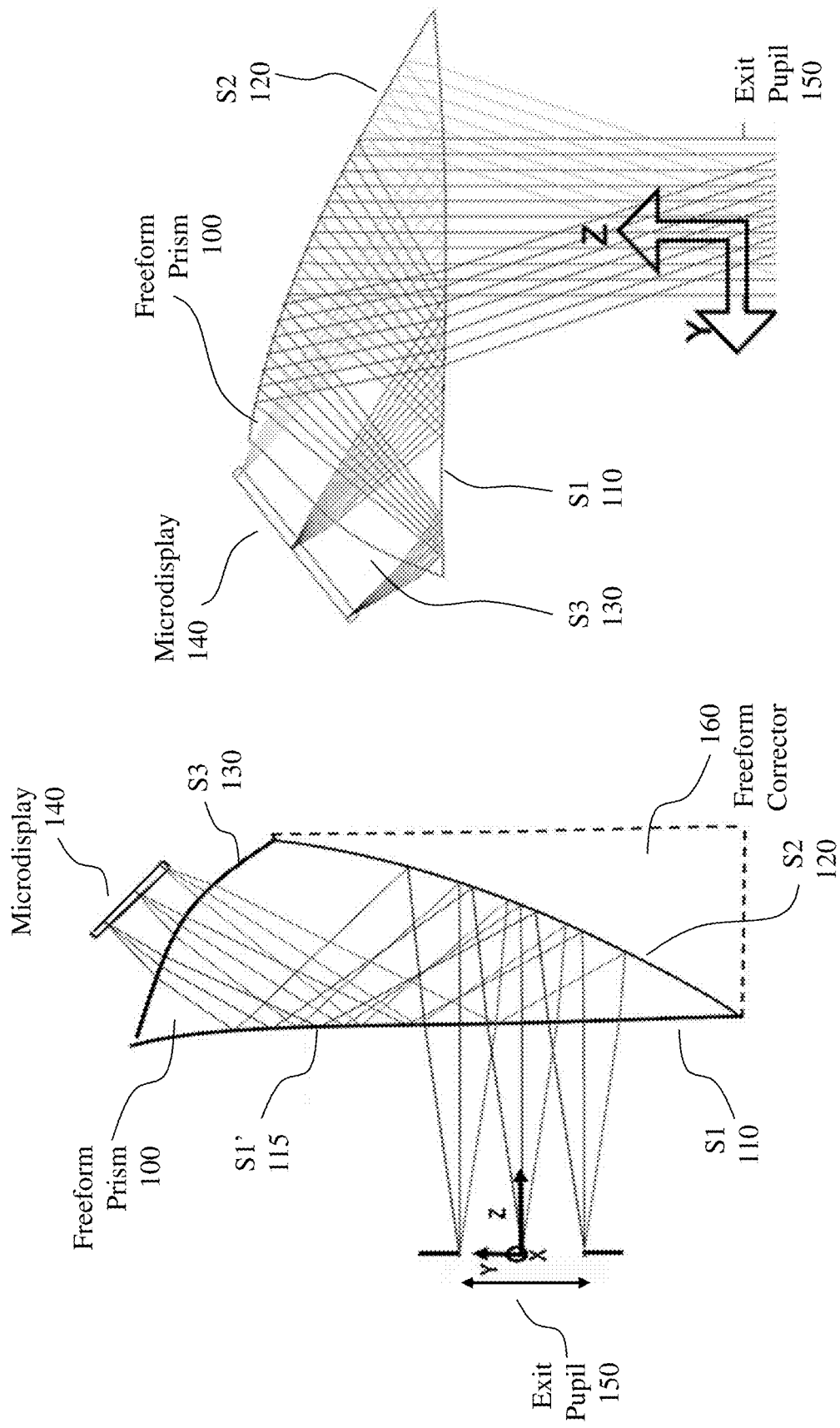
FIG. 1A depicts a side elevation view of a prior-art freeform prism-lens-based NR2I display in which the optical folding occurs along the shorter vertical dimension and the microdisplay is located above the users eye proximate to the eyebrow, along with an auxiliary lens for corrected viewing of real-world scenes.
FIG. 1B depicts a plan view of a freeform prism-lens according to an embodiment of the invention absent any auxiliary optical elements wherein the display is located proximate to the user's temple, and the optical folding within the freeform prism-lens occurs along the wider horizontal field of view (coordinate axes have been rotated)

The present invention is directed to wearable NR2I vision systems and more particularly to providing wearable NR2I vision systems with wide field of view, high image resolution, large exit pupil for eye placement, sufficient eye clearance, and elegant ergonomic design.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "head mounted NR2I display" (NR2I) as used herein and throughout this disclosure refers to a wearable device that incorporates an image presentation device operating in conjunction with a microprocessor such that a predetermined portion of an image may be presented to the user on the image presentation device (NR2I display). The image presentation device is typically an LCD display, LED display, or OLED display although any display generation device capable of being mounted and supported as part of a NR2I may be considered. As noted supra a NR2I may be configured as immersive, wherein the user views the display absent any direct external visual view, or non-immersive, wherein the user views the display with direct external visual view. Configurations of NR2I and their associated NR2I display may include immersive with direct viewer viewing of NR2I display, immersive with indirect viewer viewing of NR2I display through an intermediate optical assembly, non-immersive with direct viewer viewing of NR2I display which is substantially transparent, immersive with indirect viewer viewing of NR2I display through an intermediate optical assembly. Optical sub-assemblies for indirect viewer viewing of the NR2I display may employ the NR2I display to the sides of the viewer's head or above the viewers eyeline. Non-immersive configurations may employ a non-transparent display or optical assembly where the display presents to a smaller field of view than the user's full field of view or is within their peripheral vision such that it does not overlay the central portion of their field of view.

A NR2I may be monocular or binocular. A NR2I display may be fixed, i.e. when worn it is in a fixed configuration relative to the user's head, or bioptic, i.e. when worn it allows the user to vary the NR2I configuration relative to their head in two (2), three (3), or more predetermined positions and/or may be continuously or pseudo-continuously variable. In some instances, the NR2I may pivot automatically between positions based upon user's head position or it may be moved manually etc. The NR2I display may be mounted to a frame worn by the user that simply supports the NR2I display or the frame may include one or two lenses, prescription lenses, filters, polarizing elements, photochromic elements, electrochromic elements, etc. The NR2I display may be fixed to the frame or demountably attached to the frame. The NR2I display may include additional elements such as electronics, one or more cameras, one or more optical emitters, one or more wireless interfaces, one or more wired interfaces, and one or more batteries.

A NR2I display may present an image to the user which may be acquired from a camera also forming part of the NR2I or a camera associated with the user such as through a remotely attached camera for example. Alternatively, the image(s)—video content may be acquired from a portable electronic device, a fixed electronic device, a cable set-top box, satellite set-top box, or any video source. The image presented to the user may be as directly acquired, processed to fit display, etc. or aligned to elements within the field of view based upon image processing such that, for example, a schematic overlay may be aligned to a circuit being worked upon by the user. Within other embodiments of the invention the image may be processed to augment/enhance the visual perception of the user.

An NR2I display may include a microprocessor together with any other associated electronics including, but not limited to, memory, user input device, gaze tracking, inertial sensors, context determination, graphics processor, and multimedia content generator may be integrated for example with the NR2I, form part of an overall assembly with the NR2I, form part of the PED, or as discrete unit wirelessly connected to the NR2I and/or PED. Accordingly, for example, the NR2I displays may be coupled wirelessly to the user's PED whereas within another embodiment the NR2I may be self-contained.

A "freeform optical element" as used herein and through this disclosure refers to, but is not limited to, an optical element such as a lens, prism, mirror, etc. which exploits one or more freeform optical surfaces.

A "freeform optical surface" as used herein and through this disclosure refers to, but is not limited to, an optical surface that is by design non-rotationally symmetric and/or has non-symmetric features. These surfaces leverage a third independent axis, the C-axis from traditional diamond turning terminology, during the creation process to create these optical surfaces with as designed non-symmetric features. Such freeform optical surfaces may exploit, for example, the Zernike polynomial surface or its derivatives, multi-centric radial basis function (RBF) surfaces, Q-polynomial surfaces, non-uniform rational B-splines (NURBS). In some instances, multicentric RBF surfaces are an added layer on an optical surface shape that may itself vary, for example, from a basic spherical surface to a Zernike surface.

A "wearable device" or "wearable sensor" as used herein and through this disclosure refers to, but is not limited to, miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, smart glasses, environmental sensors, medical sensors, biological sensors, physiological sensors, chemical sensors, ambient environment sensors, position sensors, and motion sensors.

A "wearer", "user" or "patient" as used herein and through this disclosure refers to, but is not limited to, a person or individual who uses the NR2I either as a patient requiring visual augmentation to fully or partially overcome a vision defect or as an ophthalmologist, optometrist, optician, or other vision care professional preparing a NR2I for use by a patient. A "vision defect" as used herein may refer to, but is not limited, a physical defect within one or more elements of a user's eye, a defect within the optic nerve of a user's eye, a defect within the nervous system of the user, a higher order brain processing function of the user's eye, and an ocular reflex of the user. A "wearer" or "user" may also be an individual with healthy vision, using the NR2I in an application other than for the purposes of ameliorating physical vision defects. Said applications could include, but are not necessarily limited to gaming, augmented reality, night vision, computer use, viewing movies, environment simulation, training, remote-assistance, etc. Augmented reality applications may include, but are not limited to, medicine, visual assistance, engineering, aviation, training, remote-assistance, tactical, gaming, sports, virtual reality, environment simulation, and data display.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer of the adult device or established by an individual through a user interface to the adult device or a PED/FED in communication with the adult device.

1. Optical Train Design

Many methods have been explored to achieve an NR2I optical system which fulfils the requirements outlined in the background. These methods include applying catadioptric techniques, introducing new elements such as aspherical surfaces, holographic and diffractive optical components, exploring new design principles such as using projection optics to replace an eyepiece or microscope type lens system in a conventional NR2I design, and introducing tilt and decenter or even freeform surfaces. Within these different methods that of freeform optical technology has demonstrated promise in designing the required compact NR2I systems. In particular, a wedge-shaped freeform prism-lens takes advantage of total internal reflection (TIR), which helps minimize light loss and improve the brightness and contrast of the displayed images.

1.1 Wedge Freeform Prism-Lens Prior Art

The concept of freeform NR2I designs with a wedge-shaped prism-lens can be traced back to work by Morishima et al. at Canon followed by fabrication and evaluation method exploration by Inoguchi et al. Subsequently, within the prior art following this initial work multiple attempts have been made to design NR2Is using freeform surfaces, and more particularly designs based on a wedge-shaped prism such as within U.S. Pat. Nos. 5,699,194, 5,701,202, and 5,706,136. Within the prior art a freeform prism design offering an FOV of 34° and a thickness of 15 mm has been reported whilst a 51° optical see-through NR2I (OST-NR2I) design was achieved combining a freeform prism and an auxiliary lens attached to the prism. U.S. Pat. No. 9,239,453 describes a 53° OST-NR2I design with low F-number and within other prior art a high-resolution OST-NR2I design has been reported integrated with eye-tracking capability.

Referring to FIG. 1A there is depicted a schematic layout of a typical freeform prism 100 design consisting of three optical surfaces, labelled as S1 110, S2 120, and S3 130. The freeform prism-lens 100 serves as the NR2I viewing optics that magnifies the image displayed on a MicroDisplay 140. For the sake of convenience, the surface adjacent to the exit pupil is labeled as S1 110 in the refraction path and as S1' 115 in the reflection path. The center of the exit pupil 150 was set by the inventors as the origin of the global coordinate system and the surfaces are specified with respect to this global reference. The inventors further adopted the convention of tracing the system backward, namely from the eye position to the microdisplay. The overall system was set to be symmetric about the YOZ plane, but not the XOZ plane as common within the prior art. In FIG. 1A the Z-axis is along the viewing direction, X-axis is parallel to the horizontal direction aligning with inter-pupillary direction, and the Y-axis is in the vertical direction aligning with the head orientation. Accordingly, an optical "ray" emitted from a point on the microdisplay is refracted first by the surface S3 130 disposed towards the microdisplay. After two consecutive reflections by the surfaces S1' 115 and S2 120, this ray is transmitted through the surface S1 110 and reaches the exit pupil 150 of the system. To enable optical see-through capability, an auxiliary lens, referred to as a freeform corrector 160, may be coupled and/or cemented to the wedge-shaped freeform prism-lens 100 in order to minimize the ray shift and distortion introduced to the rays from a real-world scene.

As discussed supra prior art wedge-prism-based eyepiece designs have several limitations. First of all, the exit pupil diameter (EPD) of most existing designs is typically from 4 to 8 mm, which essentially results in a limited eyebox size. The eyebox defines a 3D volume in which the pupil of a viewer is placed to see the entire field of view of the display without losing imagery. A larger eyebox is preferred for NR2I systems in order to facilitate ease of use and comfort.

Secondly, in most of the existing designs, the size of the microdisplays is relatively large, in the range of 20-33 mm (0.8"-1.3"), which affords for a relatively large focal length or low optical power to achieve a typical 40-degree (40°) field of view (FOV). Even with an exit pupil of 8 mm, the system F/# remains fairly high (greater than 3) and eases the optical design challenge. However, the large microdisplay offsets the advantage the compactness of using a freeform prism-lens. Reducing, the microdisplay, for example to 15 mm (0.6"), has been reported within the prior art with a 53-degree (53°) FOV but requiring a substantially reduced focal length of ~15 mm. This makes it very challenging to design a system with a large exit pupil and long eye clearance distance. As a result, prior art designs compromise the size of non-vignetted exit pupil diameter (about 6 mm) by allowing a significant amount of vignetting for large field positions, which compromises the effective eyebox size to about 8 mm at the designed eye clearance position.

Thirdly, the pixel size of the microdisplays used in most of the existing designs is typically 15 µm or larger. As a result, relatively low optical power or long focal length is adequate for the eyepiece prism-lens to achieve a moderate FOV. For instance, the prior art 53° FOV system employed a microdisplay with pixels approximately 15 µm which partly mitigates the challenges of designing a large FOV system. However, reducing the microdisplay pixel dimension, for example to 10 µm, requires that the freeform prism-lens afford much higher optical resolution, e.g. 50 lps/mm at 10 µm versus 33 lps/mm at 15 µm. Larger microdisplays tend to help mitigate the challenges of designing a high resolution system. In general, it is very challenging to design a freeform prism-lens eyepiece achieving low F-number and high optical resolution for a broad spectrum without adding additional elements for chromatic aberration correction.

Finally, the freeform prism-lens typically is symmetric about the plane in which the surfaces are rotated and decentered and the optical path is folded. For instance, the prism-lens schematic in FIG. 1A was set to be symmetric about the vertical YOZ plane. The optical surfaces are decentered along the vertical Y-axis and rotated about the horizontal X-axis so that the optical path is folded in the vertical YOZ plane to form a prism-lens structure. With this type of plane-symmetry structure, it is very challenging to achieve a wider field of view for the folding direction than the direction with symmetry. Accordingly, prior art freeform prism-lenses typically fold the optical path in the direction corresponding to the direction of narrower FOV as shown in FIG. 1A, which makes it easier to achieve total internal reflection (TIR) in surface S1' 115 and maintain a valid prism-lens structure. As most display applications typically prefer a landscape-type display, then NR2I systems typically align the wider FOV direction horizontally and the narrower FOV direction vertically. As a result, most of the freeform prism-lens-based NR2I optical systems mount the microdisplays above the user's eyebrow(s), which leads to a front-heavy system and compromises overall ergonomic design.

Accordingly, it would be evident that the freeform prism-lens 100 designs that fold the optical path along the wider FOV direction allow for mounting of the microdisplays on the temple sides of the user and mitigate ergonomic challenges. In the prior art, there are instances of freeform prism-lens designs folded in the direction corresponding to the wider FOV. However, such prior art designs exploiting microdisplays which were both larger (18 mm, 0.7" diagonal) overall and with larger pixels (15 µm) and yielded optical trains for NR2I systems that had smaller exit pupil and inferior ergonomics and usability than that targeted by embodiments of the present invention.

For users exploiting NR2I systems to overcome vision degradation etc. then the user is looking at longer periods of use than common within the commonly touted application of NR2I displays in gaming systems and/or vision augmentation at work. Potentially, the user is wearing them all their waking day, e.g. 15, 16, 17 hours a day, 7 days a week, 365 days a year. In this environment large exit pupil and effective ergonomics are important for comfort, usability, etc.

1.2 Single Element Freeform Prism-Lens Design

In order to address and overcome the challenges described supra in respect of the requirements of users and prior art NR2I systems the inventors have established a single-element freeform prism-lens system design methodology. Within embodiments of the invention presented within this specification a NR2I display system employing a single-element freeform prism-lens is presented that achieves a high optical resolution with a diagonal FOV of approximately 40°, a large exit pupil of approximately 12 mm, low vignetting, and provides for a large eye clearance distance greater than 21 mm. Within the following description in respect of embodiments of the invention the microdisplay was assumed to be a 0.5" organic light emitting diode (OLED) display with a 10 µm color pixel dimension and pixel dimensions 1024×768. However, the NR2I system design itself, however, is able to support different free-form prism-lens designs, and micro-displays of different dimensions and resolutions or other types of microdisplays such as liquid crystal displays with pixel dimension(s) greater than 8 µm.

Figure 5:
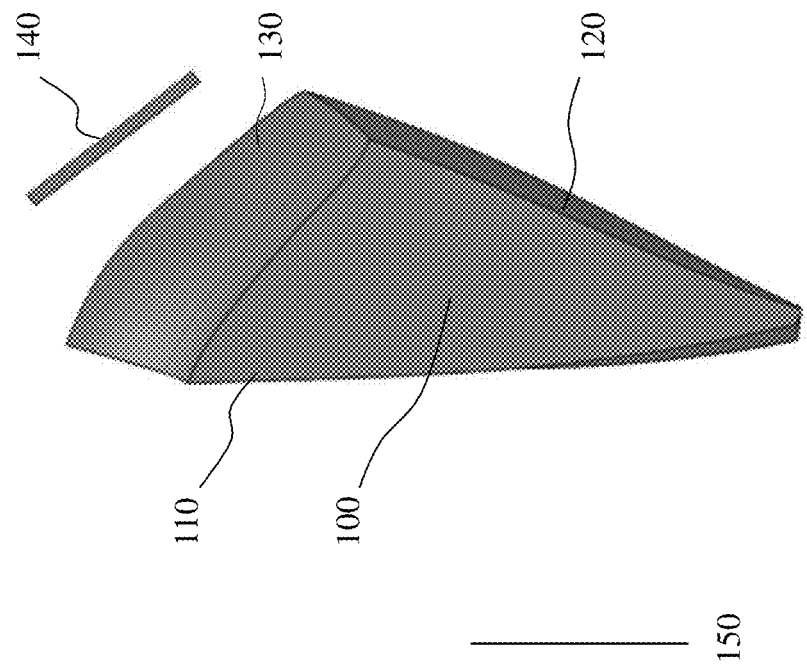
FIGS. 4 and 5 depict 3D CAD models of a prism-lens design according to an embodiment of the invention in perspective and plan views, respectively.
Figure 4:
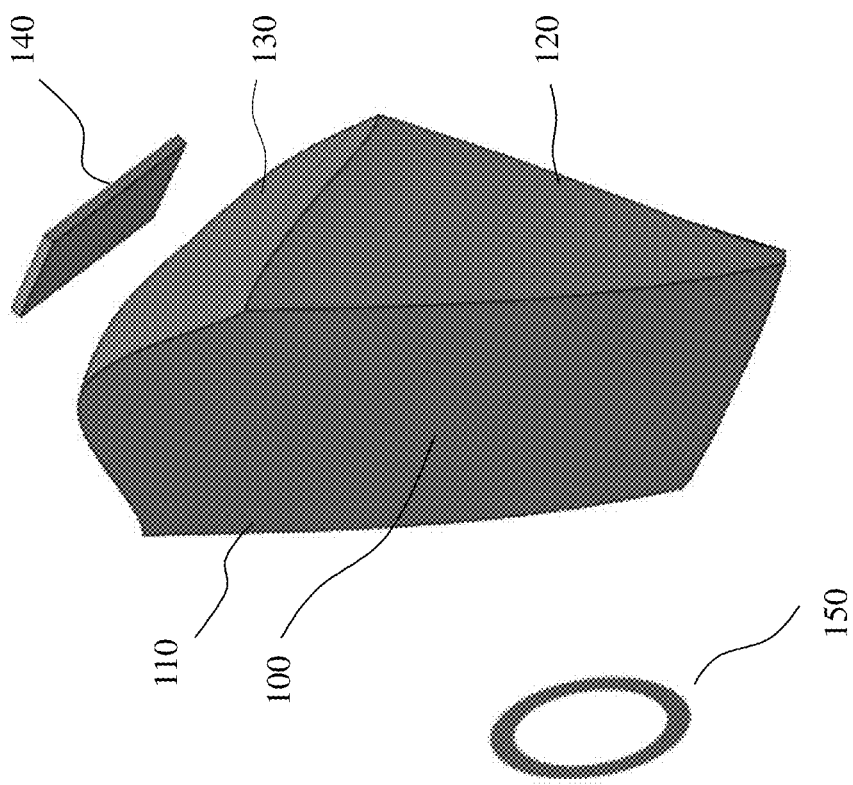

Referring to FIGS. 1B, 4 and 5 respectively there are depicted a 2D optical layout and perspective and plan 3D CAD model views, respectively, of a freeform prism-lens absent any auxiliary optical elements as can be employed within the NR2I system according to an embodiment of the invention. A ray emitted from a point on the microdisplay is first refracted by the surface S3 130 next to the microdisplay. After two consecutive reflections by the surfaces S1' 115 and S2 120, the ray is transmitted through the surface S1 110 and reaches the exit pupil 150 of the system. The first surface (i.e., S1 110 and S1' 115) of the prism-lens is required to satisfy the condition of total internal reflection for rays reflected by this surface S1' 115. The rear surface S2 120 of the prism-lens may, optionally, be coated with a mirror coating for immersive NR2I systems thereby blocking the user's view of the real world scene except as presented upon the microdisplay. Alternatively, the surface S2 120 may be coated with a beam-splitting coating if optical see-through capability is desired using the auxiliary lens (not shown for clarity).

It should be noted that in the design disclosed according to an embodiment of the invention is presented with the global reference coordinate system centered with respect to the exit pupil, like most of the existing freeform prism-lens designs. However, the reference axes are set differently from the existing designs presented within the prior art. Here the Z-axis is along the viewing direction, but the Y-axis is parallel to the horizontal direction aligning with inter-pupillary direction, and the X-axis is in the vertical direction aligning with the head orientation. In other words, the reference coordinate system is rotated 90-degrees around the Z-axis. As a result, the overall prism-lens system is symmetric about the horizontal (YOZ) plane, rather than a typical left-right symmetry about the vertical plane. The optical surfaces (S1 110, S2 120, and S3 130) are decentered along the horizontal Y-axis and rotated about the vertical X-axis. As a result, the optical path is folded in the horizontal YOZ plane, corresponding to the direction of wider field of view, to form a prism-lens structure. This arrangement allows the microdisplay to be mounted on the temple side of the user's head, resulting in a much more balanced and ergonomic system packaging concept than a typical vertical-folding design with the microdisplay located above the eyebrow. It would be further evident that in the embodiments of the invention described within this specification that they differ from a typical vertical-folding design in which the FOV in the folding direction is narrower than the non-folding direction. Rather, embodiments of the invention have a FOV in the folding direction is much wider than the non-folding direction, which makes a high-performance design very challenging.

The overall specifications of an exemplary optical system according to an embodiment of the invention within which freeform prism-lens 100 according to embodiments of the invention may be exploited are summarized in Table 1. The inventor's goal is to achieve a very compact, lightweight, and wide FOV design using a wedge-shaped freeform prism-lens with a large exit pupil and high optical resolution. Another requirement is to mount the microdisplays on the temple sides to avoid front-heaviness and improve ergonomic balance, which requires folding the optical path within the prism-lens along the wider FOV direction. A small size microdisplay with high resolution was therefore also preferred. Based on the size, resolution, availability and cost, as noted supra a 0.5" OLED was selected with resolution 1024×768 pixels and an approximately 10 µm pixel size.

The inventor's further targeted an NR2I system with a diagonal full FOV of about 40°, which corresponds therefore to a focal length of approximately 18 mm (0.7"). This combination offers a reasonable balance between FOV and angular resolution (1.8 arc minutes per pixel). In the design of visual instruments, especially NR2Is, a large exit pupil is beneficial to account for the swiveling of the eyes in their sockets without causing vignetting or loss of image. A large pupil offers better tolerance also to the inter-pupillary distances (IPD) among different users without the need to mechanically adjust the eyepiece optics, and can allow moderate electronic IPD adjustment by laterally displacing the displayed pixels. A large pupil, however, often not only compromises the compactness and weight of the optical system, but also imposes limitations on the FOV due to the dramatically increased challenge of designing low F/# systems. Taking into account these factors, in one embodiment the inventors set the exit pupil diameter to be 12 mm (0.5") with no more than 40% vignetting at the maximum field positions, which leads to a system with an F/# of about 1.5 for the center fields. In designing NR2I systems, a large eye clearance is also desirable to accommodate users wearing eyeglasses, but it affects the compactness of the viewing optics. A minimum 20 mm (0.8") eye clearance was set to accommodate users wearing eyeglasses etc.

Among the aberrations of an optical system, distortion causes the warping of the displayed image without reducing image sharpness, which allows computational or electronic correction. In designing conventional NR2Is it is common to optimize the system to minimize the optical aberrations that reduce image quality which cannot be compensated electronically or computationally. In a freeform prism-lens eyepiece, however, the distortion can be very large and irregular if it is left without any constraints. The inventors therefore established a distortion limit of approximately 10% at the maximum field angle and assume that the residual distortion may be corrected using computational methods such as described within U.S. Provisional Patent Application 62/150,911 entitled "Methods and Devices for Optical Aberration Correction". In terms of other types of aberrations, the modulation transfer function (MTF) was selected to evaluate the overall image sharpness and was set to be no less than 10% across the entire visual field at a spatial frequency of 50 lps/mm which corresponds to the Nyquist sampling frequency of the microdisplay selected for an embodiment of the invention.

TABLE 1

Specifications of one embodiment of the NR2I System

| Element | Parameter | Specification |
| --- | --- | --- |
| Microdisplay | Size | 12.7 mm (0.5") |
| | Active Display Area | 10.14 × 7.60 mm (0.4" × 0.3") |
| | Resolution | 1024 × 768 pixels |
| | Pixel Size | 10 μm |
| Freeform Prism-Lens | Type | Folded |
| | Effective Focal Length | ~18 mm (0.7") |
| | Exit Pupil Diameter | 12 mm (0.47") |
| | Eye Clearance | >20 mm (>0.78") |
| | Eye Relief | >23 mm (>0.9") |
| | F/# | 1.5 |
| | Number of Freeform Surfaces | 3 |
| | Wavelength | 465 nm ≤ λ ≤ 650 nm |
| | Field of View | >30°(H) × 23°(V) |
| | Vignetting | <40% for top and bottom fields |
| | Distortion | <10% at maximum field |
| | Image Quality | MTF > 10% at 50 lps/mm 5 |
| | Optical Path Folding Direction | Horizontal |

It is important to select a suitable method for a freeform surface representation. Different representation methods not only have different impacts on the ray tracing speed and the convergence of optimization, in the inventor's experience, but also offer different degrees of design freedom. A suitable representation method should 1) provide adequate degrees of freedom; 2) require a reasonable amount of ray tracing time; 3) offer reliable convergence in the optimization process; and 4) be orthogonal. Many types of orthogonal or non-orthogonal polynomial equations can be utilized to describe a freeform surface. For instance, a freeform surface could be represented by Equations (1A) and (1B) where z is the sag along the local z-axis, x and y are the coordinates in the local coordinate system, k is the conic constant, $c_x$ is radius of curvature of surface in sagittal direction, $c_y$ is radius of curvature of surface in tangential direction, and $C_j$ is the coefficient for $x^{2m}y^n$.

$$z = \frac{c_x x^2 + c_y y^2}{1 + \sqrt{(1 - (1+k)c_x x^2 - (1+k)c_y y^2)}} + \sum_{j=1}^{37} C_j x^{2n} y^n \quad (1A)$$

$$2m + n \leq 10; m = 0, 1, 2, \ldots, 10; n = 0, 1, 2, \ldots, 10 \quad (1B)$$

As an embodiment example, the inventors chose to use a user-defined surface representation, known as Yabe surfaces, after taking into account these factors listed above. A freeform surface shape symmetric to the X-axis is represented by an axially asymmetric quadratic and a set of orthogonal polynomials as given by Equation (2) where z is the sag along the local z-axis, x and y are the coordinates in the local coordinate system, $c_{xx}$, $c_{yy}$, and $c_{xy}$ are the curvature tensor at the origin, γ is a conic-like constant, and $r_0$ is the radius of the surface. The orthogonal polynomials on the unit circle are expressed by Equations (3) and (4) where u=ρ sin θ and v=ρ cos θ.

$$z(x, y) = \frac{c_{xx}x^2 + 2c_{xy}xy + c_{yy}y^2}{1 + \sqrt{1 - \gamma(c_{xx}x^2 + 2c_{xy}xy + c_{yy}y^2)}} + \sum_{n=0}^{N}\sum_{k=0}^{n} b_n^{n-2k} W_n^{n-2k}(x/r_0, y/r_0) \quad (2)$$

$$W_n^m(u, v) = Q_n^m(\rho)\cos(m\theta) \quad (3)$$

$$W_n^{-m}(u, v) = Q_n^m(\rho)\sin(m\theta) \quad (4)$$

With this orthogonal surface representation, the paraxial properties, high-order surface shapes, and surface tilt are clearly separated. Most of the commercially available optical design software tools, such as CODE V® by Optical Research Associates, provide the ability to model freeform surfaces in user-defined methods. Though the ray tracing speed of user-defined representations typically is much slower than the standard methods available in the software packages, the orthogonal surface representation could yield more efficient and compact surface representation than the more commonly used xy-polynomials and result in faster convergence during design optimization.

Figure 6:
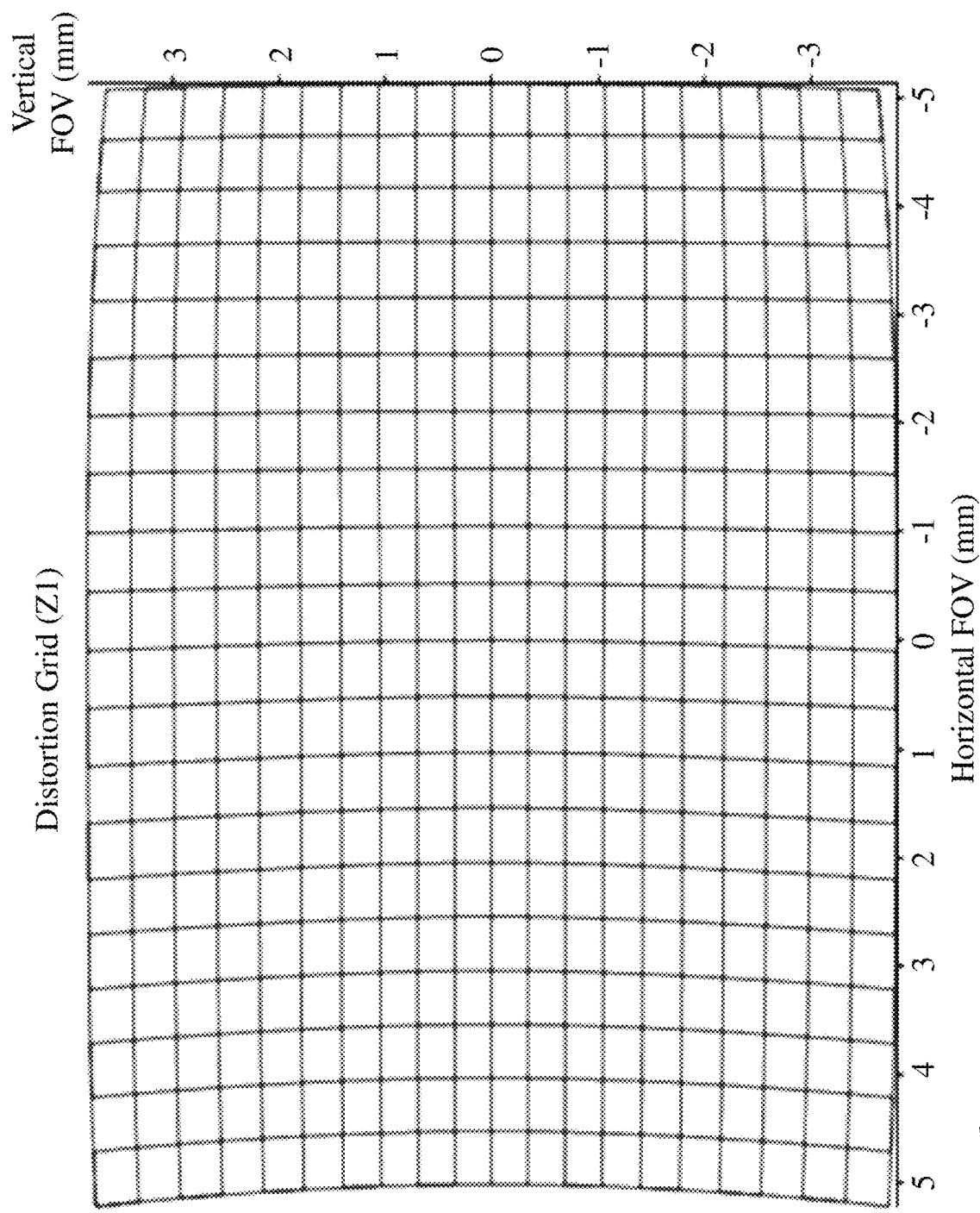
FIG. 6 depicts the distortion grid of the prism-lens design according to the embodiment of the invention depicted in FIGS. 4 and 5.
Figure 7:
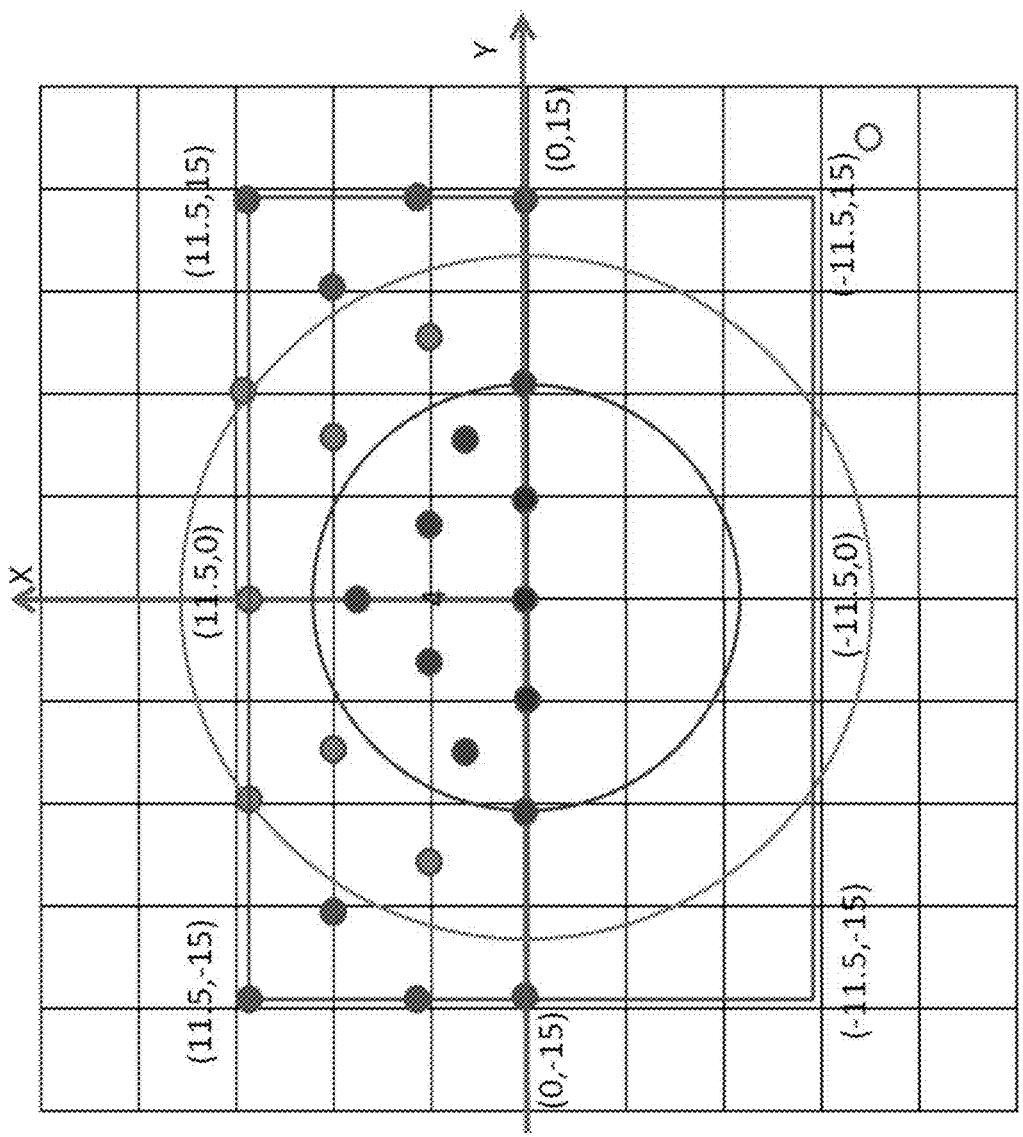
FIG. 7 depicts point-clouds of decreasing proximity to the centre-of-field employed in the simulation of the prism-lens according to the embodiment of the invention depicted in FIGS. 4 and 5.

During the design process, three representative wavelengths, λ=475 nm, λ=560 nm, and λ=610 nm were selected in order to correspond with the peak emission spectra of the blue, green and red emitters within the selected microdisplay, an OLED. The optical performance of the designed system was assessed at representative field angles for these three design wavelengths. The distortion results depicted in FIG. 6 imply that the system distortion is well controlled, being less than 5% at the edge of the field of view. Simulations and design adjustments included analysis of polychromatic MTF curves which were obtained for the 25-sampled fields depicted in FIG. 7 and were evaluated for a centered pupil. The target spatial frequency of 50 cycles/mm corresponds to the threshold spatial frequency of the microdisplay with a 10 μm pixel size. The system achieved nearly 20% MTF value for the maximum field angle at the spatial frequency of 50 cycles/mm and an average MTF value of about 50% for the center 60% of the field of view. The average MTF is greater than 50% across the entire field of view at the frequency of 33 cycles/mm which would correspond to a microdisplay pixel of 15 μm. In other words, the optical resolution of the freeform prism-lens design according to an embodiment of the invention is much higher than the existing prism designs reported within the prior art.

A further design constraint applied to the design of the freeform prism-lens 100 according to an embodiment of the invention by the inventors was that the freeform prism-lens 100 design should exploit a single type of optical material for lower complexity manufacturing. Materials may include, but not be limited to, for instance polymeric materials such as Poly Methyl MethAcrylate (PMMA) or a Cyclo Olefin Polymer (COP), although in other applications glasses and other optically transparent materials in the visible wavelength range may be employed. However, this design constraint means that the full correction of chromatic aberrations due to optical dispersion is not feasible. This is often a limiting factor for designing a freeform prism-lens with high optical resolution for a broad optical spectrum such as the full human visual spectrum. The embodiment of the invention presented within FIG. 1B was designed for use in conjunction with an organic light emitting display (OLED) which has a larger color gamut than some of the other common commercial microdisplay technologies. Accordingly, the optical performance needs to be balanced for a broad visible spectrum and as would be evident to one of skill in the art the freeform prism-lens design may be adjusted to the microdisplay or established for a broad visible spectrum allowing flexibility in microdisplay technology and emission characteristics.

Accordingly, in order to achieve high optical resolution, the inventors analysed the system response for three sampled wavelengths, $\lambda=475$ nm; 560 nm; 610 nm and adjusted the design by adjusting the weights on these sampled wavelengths such that the performance of the optical system was corrected for each of the individual wavelengths whilst leaving chromatic aberration undercorrected. As a result, the image formed by each individual wavelength has achieved very high resolution, while the display position of any given image point can be separated from those of other wavelengths originating from the same pixel position on the microdisplay.

Figure 8:
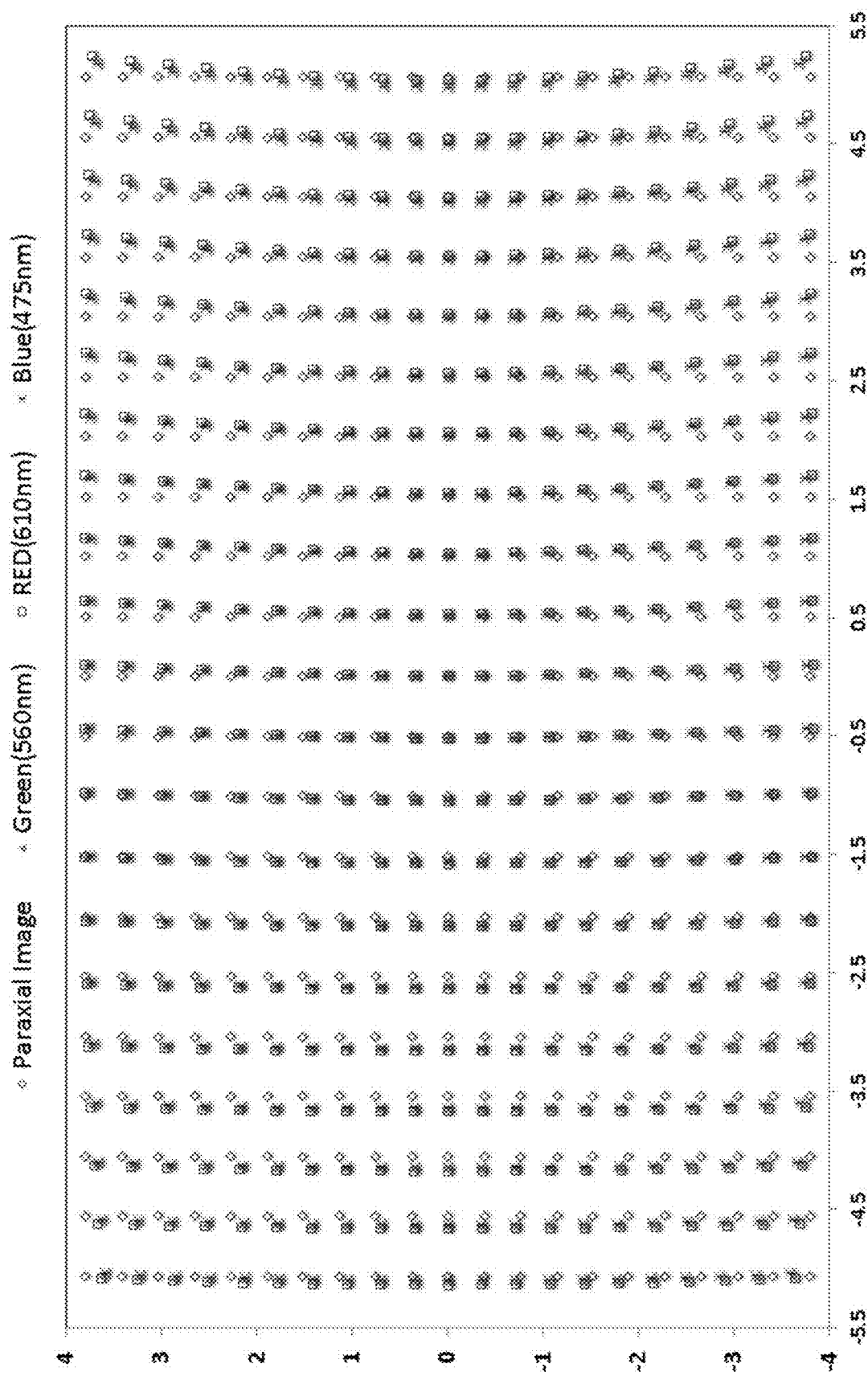
FIG. 8 depicts the full-field map of the image positions distorted by the prism-lens according to an embodiment of the invention depicted in FIGS. 4 and 5 corresponding to the three sampled wavelengths (610 nm, 560 nm, and 475 nm) along with the paraxial image positions.

Further, the spatial displacements among different color elements may be digitally corrected by applying a pre-warping operation to each individual color channel such as described by the inventors in U.S. Provisional Patent Application 62/150,911 entitled "Methods and Devices for Optical Aberration Correction". Referring to FIG. 8 there is plotted the full-field map of the image positions corresponding to the three sampled wavelengths, $\lambda=475$ nm; 560 nm; 610 nm, respectively, along with the paraxial image positions. This full-field map provides data not only for image distortion correction, but also to correct spatial displacements among different color elements for electronic pre-compensation of chromatic aberration before display. Relaxing the chromatic aberration constraint in the prism-lens itself, while achieving a corrected user-image by digitally pre-compensating the separate red, green, and blue components using these chromatic aberration maps allows for other optical parameters such as F/#, eyebox size, and focus depth to be improved beyond that which can be achieved by a non-pre-compensated system design approach.

Referring to FIG. 2 there is depicted a freeform prism-lens according to the embodiments of the invention depicted in respect of FIGS. 1A and 1B respectively and as described supra in respect of FIGS. 4 to 8 respectively. As depicted the surface adjacent to the exit pupil is labeled as S1 110 in the refraction path and as S1' 115 in the reflection path but is now depicted as being divided into three regions along these surfaces S1 110 and S1' 115 which are denoted as Region A 160, Region B 170, and Region C 180. Within Region A 160 all optical paths from the microdisplay, for example Micro-Display 140 in FIGS. 1A and 1B respectively, to the exit pupil, for example Exit Pupil 150 in FIGS. 1A and 1B respectively, are reflected by surface S1 110 and hence are defined by reflection paths on surface S1' 115. Within Region C 180 all optical paths from the microdisplay to the exit pupil are transmitted by surface S1 110 and hence are defined by refraction paths on surface S1 110. However, the middle region, Region B 170, the optical paths from the microdisplay to the exit pupil are a combination of both those reflected by surface S1 110 and hence are defined by reflection paths on surface S1' 115 and those transmitted by surface S1 110 and hence are defined by refraction paths on surface S1 110.

Within the embodiment of the invention described in respect of FIGS. 1B, 1C, and 2-8 Region B 170 has a defined length. However, it would be evident that within other designs the Freeform Prism-Lens 100 may have no Region B 170 and Regions A 160 and Region C 180 may be either "continuously" adjacent or there may be a gap between regions of the surface S1 110 having internally reflected and transmissive paths. However, within embodiments of the invention it may be necessary to limit external light from entering surface S1 110 in order to limit the so-called "flaring" of light resulting from this light being internally reflected within the Freeform Prism-Lens 100 and finally exiting surface S1 such that it enters the exit pupil. Within the embodiments of the invention described and depicted below in respect of FIGS. 9 to 19B this is achieved through the design of the holder providing an opaque mechanical "baffle" or barrier blocking external light entering the Freeform Prism-Lens 100 through Region A 160. However, it would be evident that alternatively, the Region A 160 of the Freeform Prism-Lens 100 may be reflective, e.g. silvered, painted, etc. to mask this area from light entry. In immersive implementations the same may be applied to S2 120 and non-active regions of S3 130. In embodiments described below stray light is prevented from entering the prism-lens through S2 and S3 by opaque mechanical assemblies, although other means such as silvering, partial silvering, painting etc. are evident alternatives.

2. NR2I Display Design

Figure 10A:
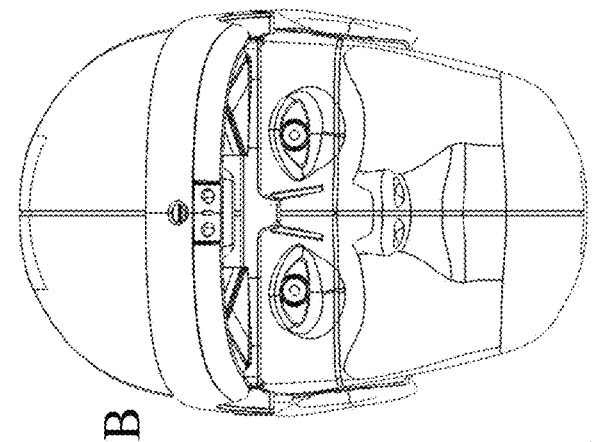
FIGS. 10A to 10C respectively depict the bioptic immersive NR2I system according to the embodiment of the invention depicted in FIGS. 9A to 9C exploiting a NR2I freeform prism-lens according to an embodiment of the invention wherein the user has pivoted the NR2I system up.
Figure 10B:
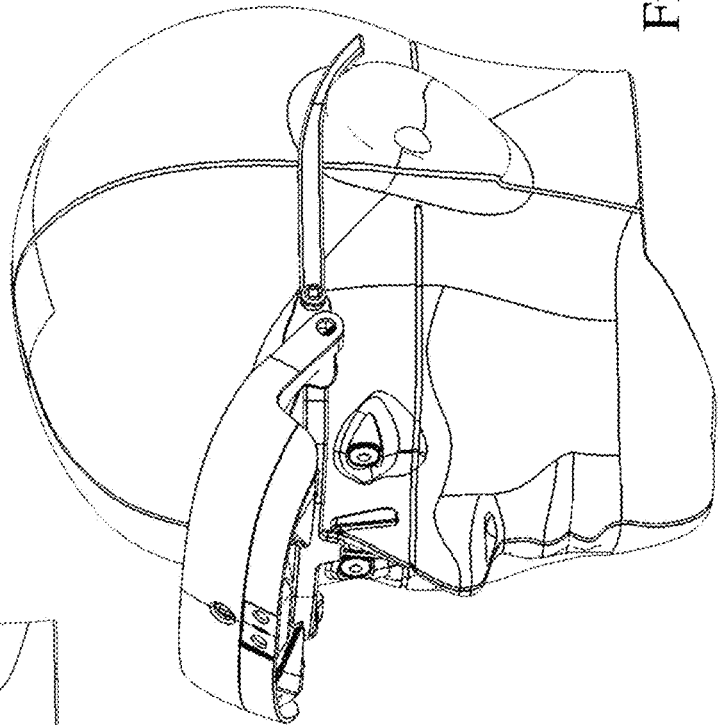
Figure 10C:
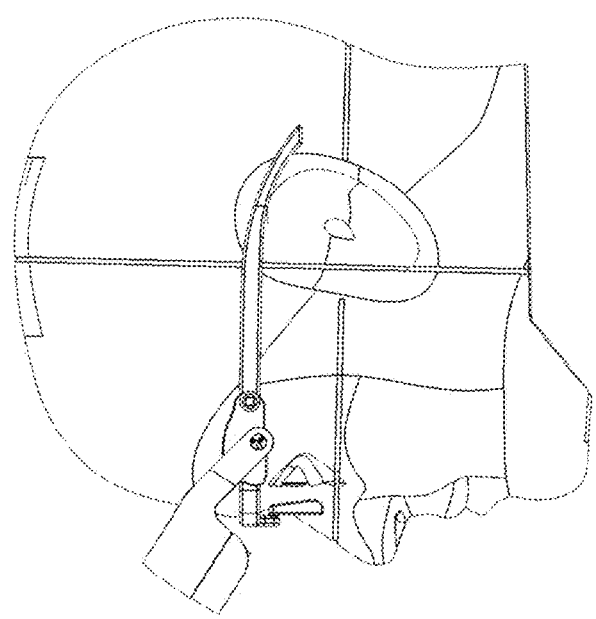

Referring to FIGS. 9A to 9C respectively there are depicted side perspective, side elevation, and front elevation views of a bioptic immersive NR2I (BI-NR2I) system according to an embodiment of the invention exploiting freeform prism-lenses according to embodiments of the invention such as described and depicted supra in respect of FIGS. 1A to 8. Within FIGS. 9A to 9C the user has the BI-NR2I system pivoted down in front of their eyes. Referring to FIGS. 10A to 10C respectively then there are depicted the same side perspective, side elevation, and front elevation views of the BI-NR2I system wherein the user has raised the BI-NR2I system up and views the external environment directly. The BI-NR2I system is attached to a frame that sits onto the bridge of the user's nose and the upper surfaces of their ears in a similar manner to conventional eyeglasses. However, the BI-NR2I system as depicted can be pivoted into and out of the line of sight of the user.

Within other embodiments of the invention the NR2I system may be rigidly attached such that it can only be viewed immersive (I-NR2I) when worn or the NR2I system may be transmissive (T-NR2I) or bioptic transmissive (BT- NR2I) allowing the user to view the external world whilst viewing the NR2I system concurrently. Optionally, the NR2I system may be demountable from the frame such as described by the inventors within World Patent Application PCT/CA2016/000,189 filed Jul. 6, 2016 entitled "Methods and Devices for Demountable Head Mounted Displays." The NR2I system may also support additional positions either discretely or in a continuous manner such as described and depicted in U.S. Pat. Nos. 8,976,086 and 9,372,348 entitled "Apparatus and Method for a Bioptic Real Time Video System."

In brief overview and referring to FIGS. 9A to 10C respectively, the NR2I system incorporates a pair of frames and a NR2I display which is controlled by a microprocessor. The microprocessor may be a general purpose microcontroller, microprocessor, or computer o some embodiments of the invention but in other embodiments of the invention it may be an application specific integrated circuit (ASIC) or field programmable gate array (FPGA). The frame as depicted in FIG. 14A may be a lensless frame solely intended to support the NR2I display and form part of the NR2I system or alternatively it may be a frame with a single prescription lens or a pair of prescription lenses as depicted in FIG. 14B. Alternatively, it may be a baffled frame such as depicted in FIG. 14C wherein "baffles" around the frame fill the regions around the NR2I display/system and the user's head such that the effect of ambient light is reduced which may be particularly beneficial in high ambient light environments. Optionally, the lenses within the frames depicted in FIGS. 14B and 14C may be polarizing sheets such as employed in sunglasses, photochromic glass as employed in sunglasses, and filter(s) either in combination with prescription elements or in isolation. Optionally, within other designs with transmissive NR2I functionality a neutral density filter or photochromic glass may be disposed to the side distal from the user to reduce ambient lighting either by a fixed amount or variable amount.

Within the embodiments of the invention described and depicted in respect of FIGS. 9A through 18B the NR2I displays/systems have dual optical trains, one for each eye. Within other embodiments of the invention the NR2I displays/systems may be designed/configured for a single eye, e.g. the user's left or right, or may be configured in split design allowing the use of either one of or both of left and right elements. Also attached to the frame is a Headband 1110 such as depicted in FIG. 11A and as described within World Patent Application PCT/CA2016/000,189 filed Jul. 6, 2016 entitled "Methods and Devices for Demountable Head Mounted Displays." This provides additional support such that the NR2I display load is not all directly borne by the user's nose and ears. The headband 1110 is attached using Attachment Clips 1210 which are depicted in FIG. 12A but omitted for clarity in FIG. 11A. An additional strap may be attached around the rear of the user's head, not depicted for clarity, which attaches to the rear portions of the Attachment Clips 1210.

The NR2I display may include one or more image capture devices such as a CCD camera. For example, in a typical configuration the NR2I display would include a Camera 1120 facing forward although in other embodiments of the invention two or more cameras may be integrated with different viewpoints relative to the user's line of sight, e.g. lateral, rear, etc. Optionally, a visible camera and an infrared (IR) camera may be integrated allowing the user in some applications to view thermal imagery as well as their normal sight. Within embodiments of the invention the microdisplays within the NR2I may display information acquired from the camera(s) and/or one or more other sources of content including, but not limited to, other cameras, video cameras, web content, documents, streaming video, etc.

Optionally, the NR2I display may include one or more eye and/or pupil tracking sensors with their associated electronics either forming part of the NRI display electronics by design or by addition. Such a configuration is depicted in FIG. 3 wherein the Freeform Prism-Lens 100 is depicted with a Freeform Corrector 160 and the MicroDisplay 140. In addition, there are depicted Near Infra-Red (NIR) LED 210 providing infra-red illumination of the user's eye and NIR Sensor 220 which provides NIR detection and spatial signal(s) such that the user's eye is tracked allowing this information to be used either in respect of modifying the image presented to the user, augmentation content provided to the user, etc. It would be evident that if spatial separation of the NIR optical signals from the visible signals from the MicroDisplay 140 can be achieved that placement of the NIR LED 210 and NIR Sensor 220 may be varied from that depicted of either side the MicroDisplay 140.

Figure 11A:
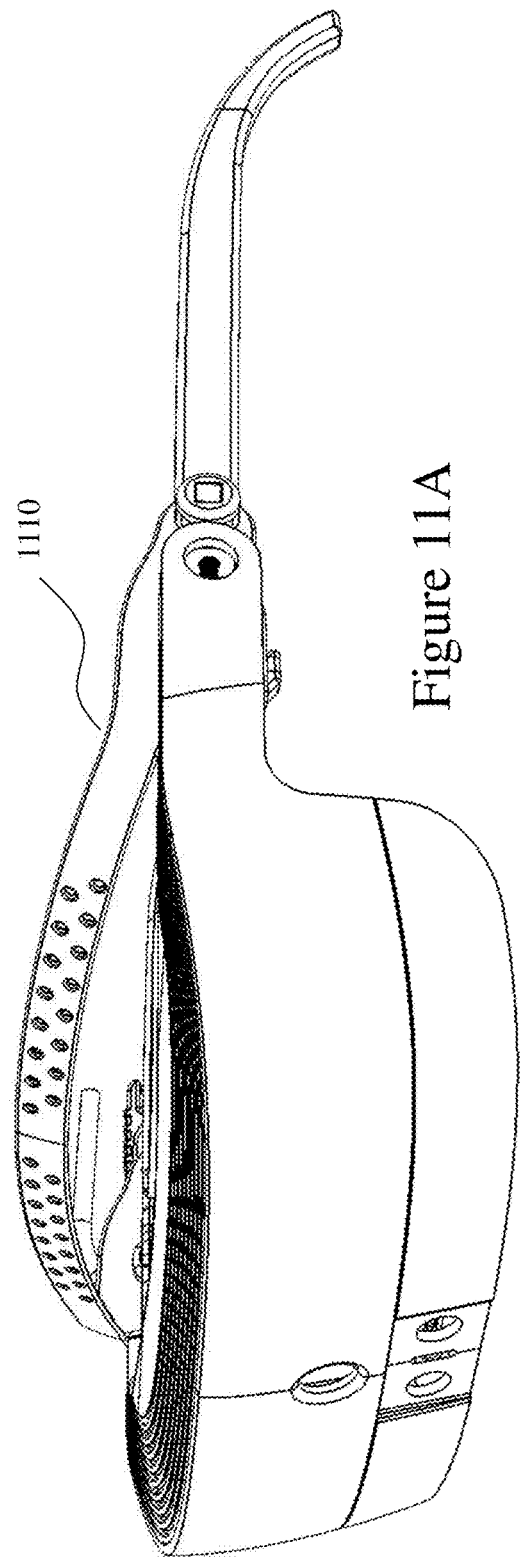
FIGS. 11A and 11B depict the bioptic immersive NR2I system of FIGS. 9A to 10C in isolation from a user.
Figure 11B:
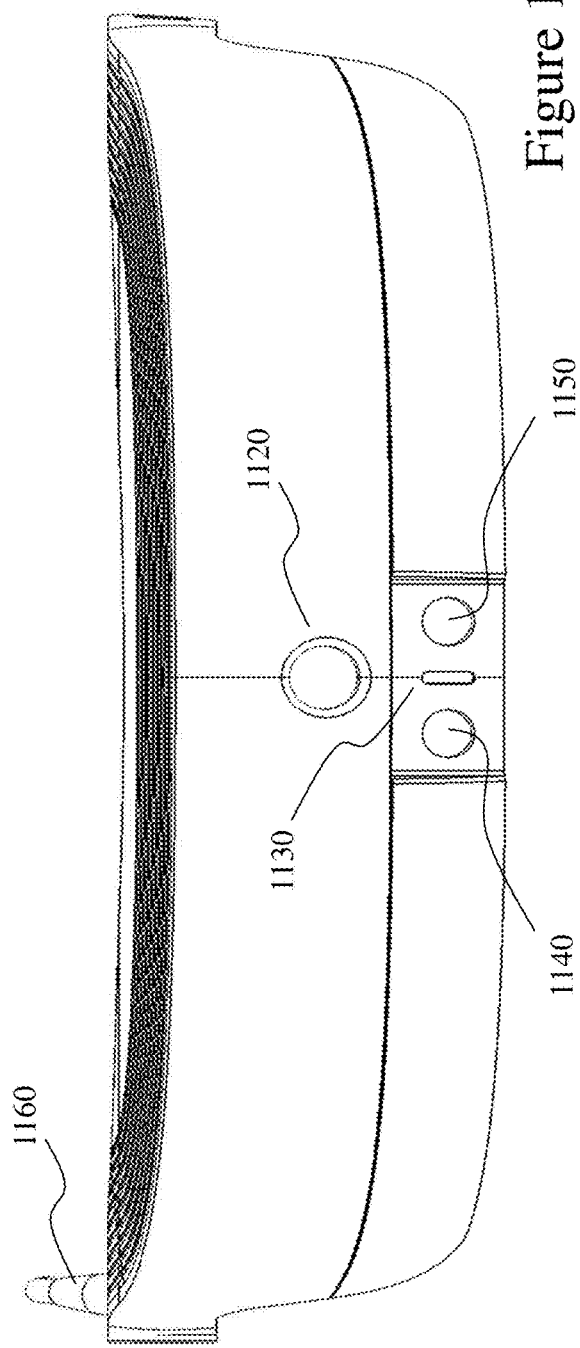

Optionally, disposed within the NR2I display as depicted in FIG. 11B is a light source/flashlight 1130 to provide illumination for the user. Optionally, two or more light sources/flashlights may be provided. Additionally, the NR2I system may include a range finder. As depicted in FIG. 11B such a range finder, second camera etc. may be fitted as depicted with first and second optical elements 1140 and 1150 respectively within the central portion of the NR2I display depicted in FIG. 11B.

The NR2I display may communicate to another electronic device, e.g. a PED and/or FED, exploiting a wired and/or wireless link. A wired link being depicted in FIG. 11B via cable 1160 which may exploit industry standard or custom connector interfaces and/or communications standards. As depicted in FIGS. 11C to 11E a common NR2I display Core 1160 may be configured with a wired interface via Cable 1170 as depicted in FIG. 11D and/or configured via wireless interfaces via first and second Antennae 1180 and 1190 respectively. First and second Antennae 1180 and 1190 may relate to a common wireless interface or they may relate to different wireless interfaces according to the design of the NR2I display and its interfaces to external network/devices etc. For example, the NR2I display may support IEEE 802.11 Wi-Fi for accessing local routers, FEDs, digital set-top boxes etc. and Bluetooth to support communications to the user's PED.

NR2I displays may support a single or multiple display technologies according to the design of the NR2I display and the resulting specifications placed on the microdisplay and therein the design and implementation of the freeform prism-lens such as described supra in respect of Section 1. Accordingly, the microdisplay(s) may be liquid crystal, e.g. Liquid Crystal on Silicon (LCOS), Light Emitting Diode (LED) based, or Organic Light Emitting Diode (OLED) technology. Within immersive embodiments of the invention the freeform prism-lens may be reflective by design and/or exploit a reflective coating. In transmissive embodiments of the invention the freeform prism-lens may be anti-reflection coated prior to assembly with additional optics such as the Freeform Corrector 160 in FIG. 1A. The visual image presented to the user may be the same, different, external view acquired with camera, or external content acquired from a PED/FED and/or remote source. For example, within an immersive NR2I system the image from the Camera 1120 may be presented to both eyes whilst the user's left eye is presented with the digital content overlaid to the image and the user's right eye is not or vice-versa. Optionally, one eye of the user is presented with the image with or without digital content overlay whilst the other eye is presented with a modified image, such as with highlighted edges, for example. Within other embodiments of the invention with dual cameras, e.g. stereoscopic image acquisition, then the user is presented with left and right images with or without digital content overlay, image modification etc. If, for example, the user is employing a NR2I device with visible and infrared cameras or receiving dual camera feeds from visible and infrared cameras then these may be presented to the user in different eyes, for example.

The Camera 1120 may be a charge coupled device (CCD) camera with high depth-of-field optics such as found in a range of high volume consumer electronic devices such as smartphones, a high quality CCD sensor such as employed in digital SLRs allowing high resolution magnification and/or image stabilisation etc. In other embodiments, the Camera 1120 may be a Complementary Metal Oxide Semiconductor (CMOS) image sensor with appropriate optics. Optionally, the Camera 1120 may be external to the NR2I display and associated with an item of apparel of the user or an item of equipment employed by the user or independent of the user, their clothing and equipment. In other various embodiments, the image capture device is any imaging device with an analog or digital signal output that can be sent to the NR2I display for processing or to the user's PED for processing and display on the NR2I display.

The optional eye tracking sensor is also in communication with the NR2I processing electronics and determines where in the visual field of view (FoV) the individual is looking. In one embodiment, this sensor operates by following the position of the user's pupil. Such eye tracking devices are common in prior art "heads-up-displays" (HUDs) utilized by military pilots. An embodiment of pupil-tracking using a horizontally-oriented wedge-shaped freeform prism-lens is shown in FIG. 3. In this embodiment the display is augmented with NIR LED 210 and NIR Sensor 220 with their light paths passing through freeform surface S3, and located proximal to the MicroDisplay 140. IR light is emitted, bounced off the user's eye, and returns to the IR sensor, whereupon the received image of the eye is digitized, and the pupil's motion tracked using digital motion-tracking algorithms. Again, although an embodiment contemplated may include two tracking sensors, because both eyes typically track together, one tracking device may be used. In another embodiment, the eye tracking sensor uses a combination of mirrors and prisms such that the optical path for the eye tracking sensor is orthogonal to the pupil. Eye tracking is used to determine the region of interest (ROI) within the FoV and either adjust and/or augment the content being presented to the user. In instances where the NR2I display is employed to address visual degradation in the user's optical vision then the eye tracking can ensure, for example, that damaged areas of the user's retina are avoided for displaying salient content within the image, the modified image, overlay content etc. or a combination thereof. The eye-tracking information would typically be averaged, filtered, etc. through software to minimize the sensitivity to random eye movements, blinks, etc., and to optimize the system for various usage models. For example, reading English requires specific eye tracking performance in the left to right direction that is different from that in the right to left direction, and different again from that in the vertical direction.

Figure 12A:
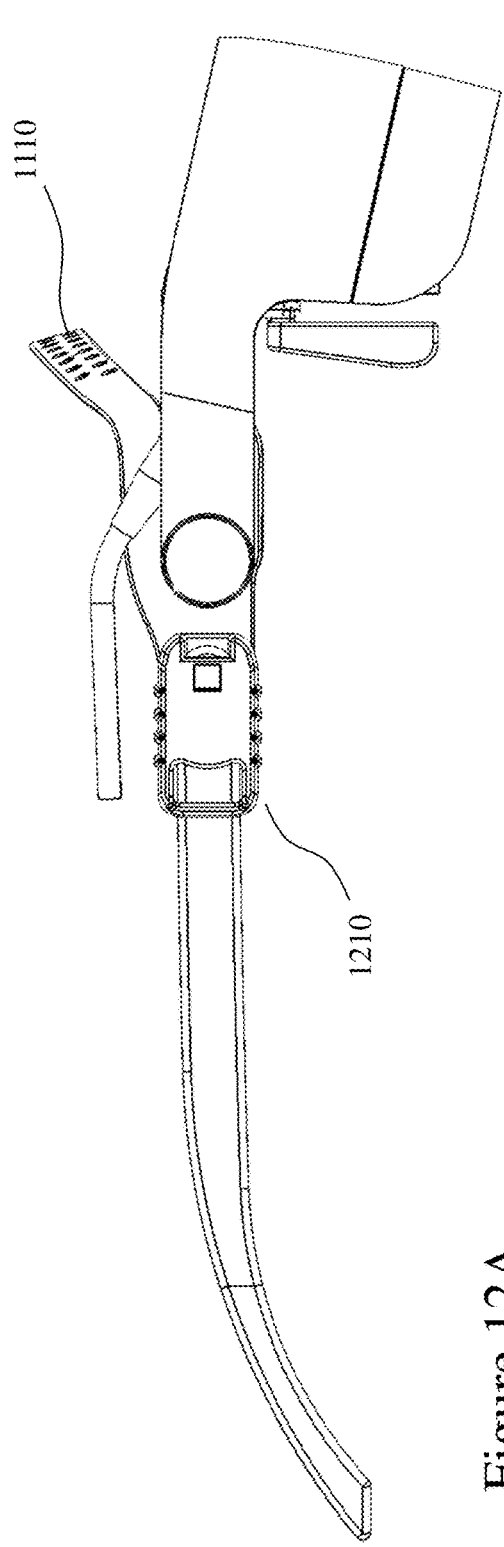
FIGS. 12A and 12B depict the bioptic immersive NR2I system of FIGS. 9A to 10C in isolation from a user in side elevation for NR2I down and raised configurations respectively.
Figure 12B:
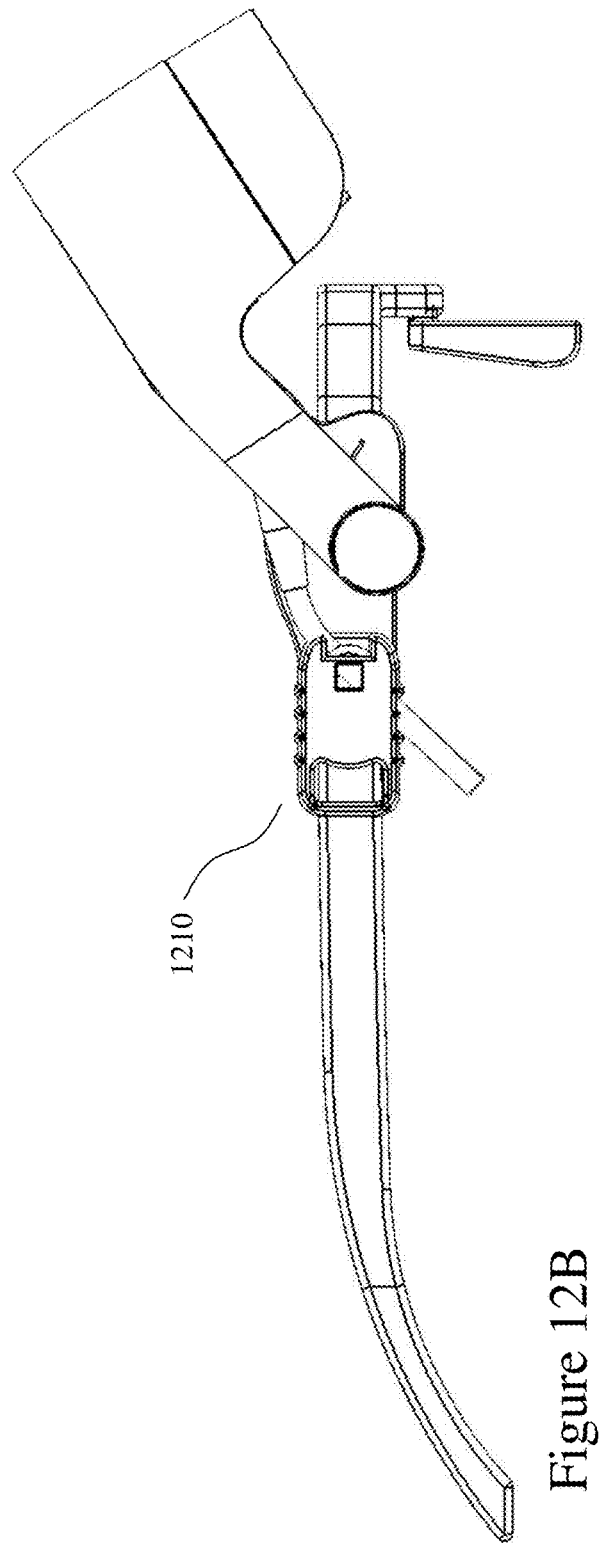
Figure 13A:
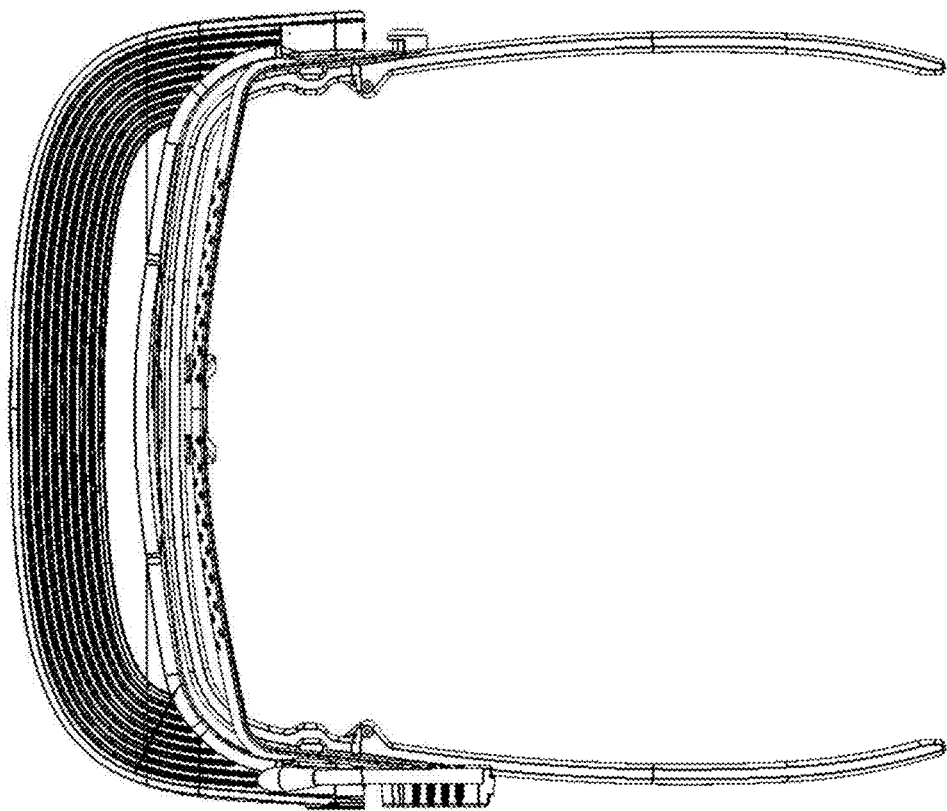
FIGS. 13A and 13B depict the bioptic immersive NR2I system of FIGS. 9A to 10C in isolation from a user in bottom and top elevations with the NR2I down.
Figure 13B:
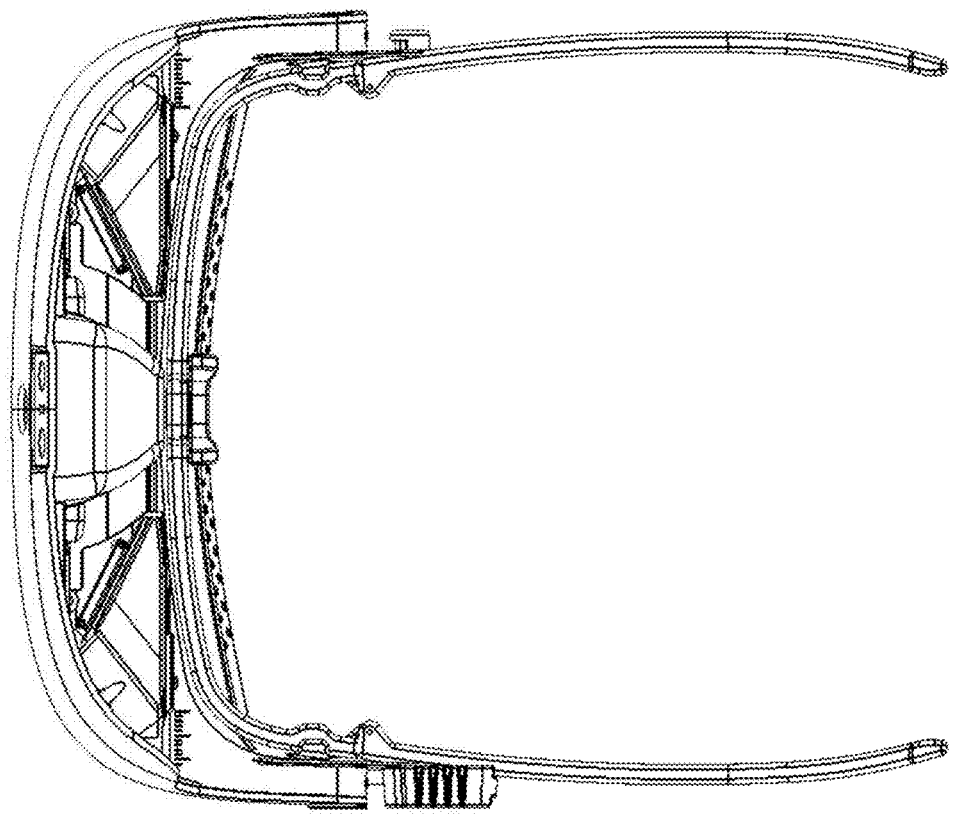

Referring to FIGS. 12A and 12B there are depicted the bioptic immersive NR2I system of FIGS. 9A to 10C in isolation from a user in side elevation for NR2I down and raised configurations respectively. FIGS. 13A and 13B depict the bioptic immersive NR2I system of FIGS. 9A to 10C in isolation from a user in bottom and top elevations with the NR2I down. Within FIGS. 12A to 13B the NR2I display is depicted assembled together with a lensless frame such as depicted by first frame 1400A in FIG. 14A with Nose Bridge 1410 and Arms 1420 which rest upon the ears of the user. Also depicted are second frame 1400B in FIG. 14B and third frame 1400C in FIG. 14C representing sunglasses and prescription eyeglasses respectively. In each instance the NR2I display is mounted to the frame via Demountable Mounts 1480 and the Headband 1110, not shown for clarity, is attached via Attachment Clips 1210. Second frame 1400B comprises Lenses 1430, e.g. tinted, polarizing or photochromic, together with Upper Baffles 1440 and Side Baffles 1450 which block extraneous light. Third frame 1400C comprises Prescription Lenses 1460. It would be evident that the Lenses 1430 may also be prescription lenses and/or that Prescription Lenses 1460 may be tinted and/or coated. Equally, Upper Baffles 1440 and Side Baffles 1450 may be applied to either first frame 1400A or third frame 1400C.

Now referring to FIGS. 15A to 15E a NR2I display such as employed within the NR2I systems depicted in FIGS. 9A to 13B sequentially separated to a subset of its constituent parts. Accordingly, the user worn NR2I display is depicted in FIG. 15A and is then depicted in FIG. 15B with the Top Cover/Heat Spreader 1510 removed which is depicted in FIG. 15E. The remainder of the upper cover fitting over the region where the electrical feedthrough for the wired interconnection fits. The Top Cover/Heat Spreader 1510 allows for heat generated by the electronics associated with the microdisplays, wired interface, wireless interface and image processing etc. are dissipated. Accordingly, the Top Cover/Heat Spreader 1510 is formed from a thermally conductive material and formed with surface features to increase the overall surface area in contact with air compared to the surface area of the Top Cover/Heat Spreader 1510 itself. Top Cover/Heat Spreader 1510 material may be selected from the group comprising metals such as copper, aluminum, zinc, and nickel for example, thermally conductive plastics such a carbon fiber loaded epoxies, alloys such as cemented carbide (WC—Co), copper tungsten (WCu), copper brass ($Cu_{0.7}Ni_{0.3}$), and thermally conductive ceramics such as aluminum nitride (AlN) or silicon carbide (SiC).

FIG. 15C depicts the NR2I Core 1160 and first and second Antennae 1180 and 1190 with the NR2I Case 1520 depicted in FIG. 15D removed. This assembly is then depicted in FIG. 16A wherein removal of the Core 1160 and first and second Antennae 1180 and 1190 yields right hand side (RHS) Prism-Lens Optical Display (POD) depicted in FIG. 16B and left hand side (LHS) POD depicted in FIG. 16C. Left/right within this specification referring to the user's eye from their viewpoint. Each POD of RHS POD and LHS POD depicted in FIGS. 16B and 16C comprising as depicted in FIG. 16D a Casing 1610 with appropriate fixturing for mounting to the Core 1160. Such fixturing includes the provision for independent lateral translation of the two PODs, for instance using rail-shaped Mounting 1640, in order to allow lateral motion to accommodate users of differing inter-pupil distance (IPD). Each POD may therefore be laterally moved by sliding the POD Mounting 1640 along a corresponding mounting projection within the Core 1160 and fixing the POD(s) in position when the correct Inter-Pupil Distance (IPD) is achieved. These also comprise MicroDisplay 1620 mounted to the Casing 1610 and Free Form Prism-Lens 1630 disposed within the Casing 1610. The Casing 1610 also includes electrical connections for power and data to the MicroDisplay 1620 from the electronics within the NR2I display. It would be evident that an identical free-form prism-lens may be used in both left and right POD assemblies. However, in other embodiments of the invention the free-form prism-lenses within the left and right POD assemblies are not identical but are in fact symmetrical mirror-images of each other. Within other embodiments of the invention the left and right free-form prism-lenses may be symmetrical mirror-images that are then modified to address specific issues relating to differences between the user's left and right eyes.

Figure 17C:
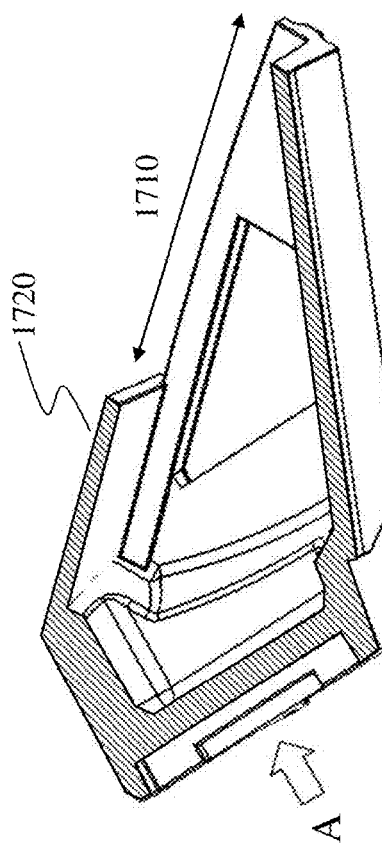
FIGS. 17A to 17D respectively depict the right eye Prism Optical Display (POD) sub-assembly together with eye facing elevation and cross-sections showing microdisplay and freeform prism-lens positioning.
Figure 17D:
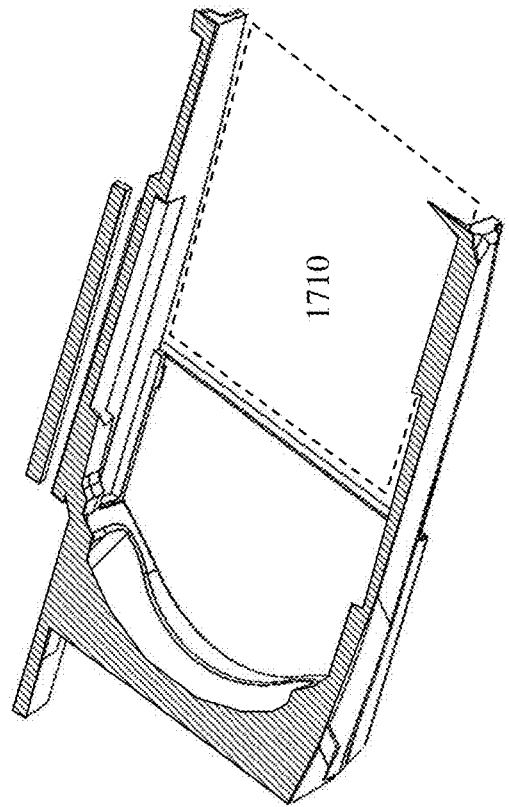
Figure 17B:
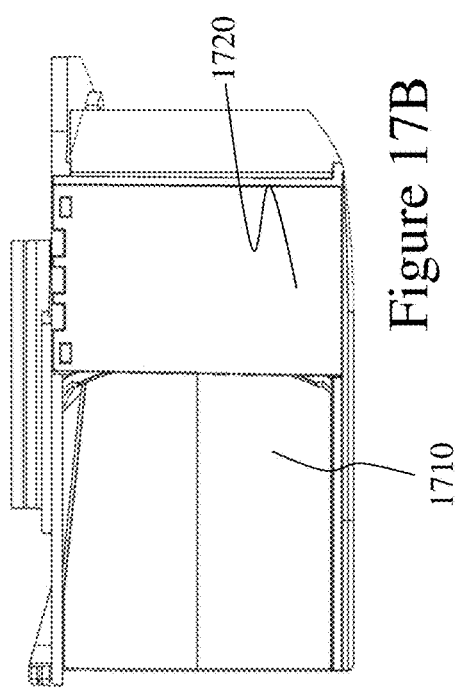
Figure 17A:
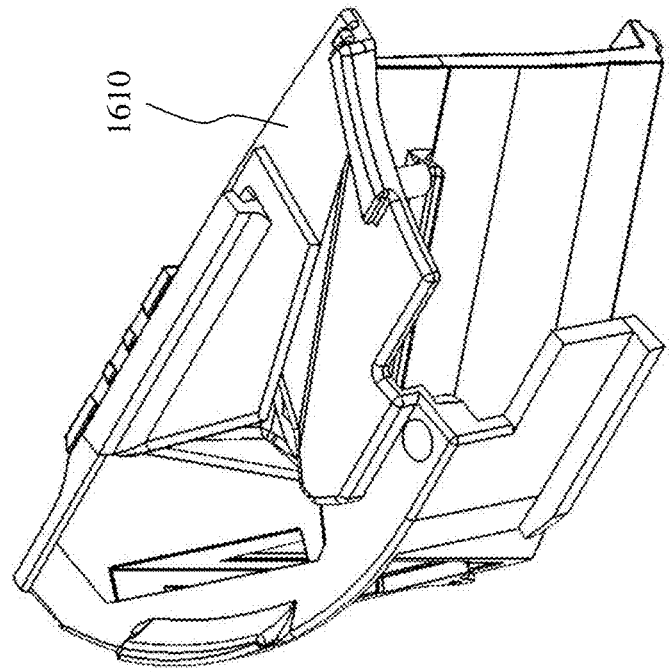
Figure 18A:
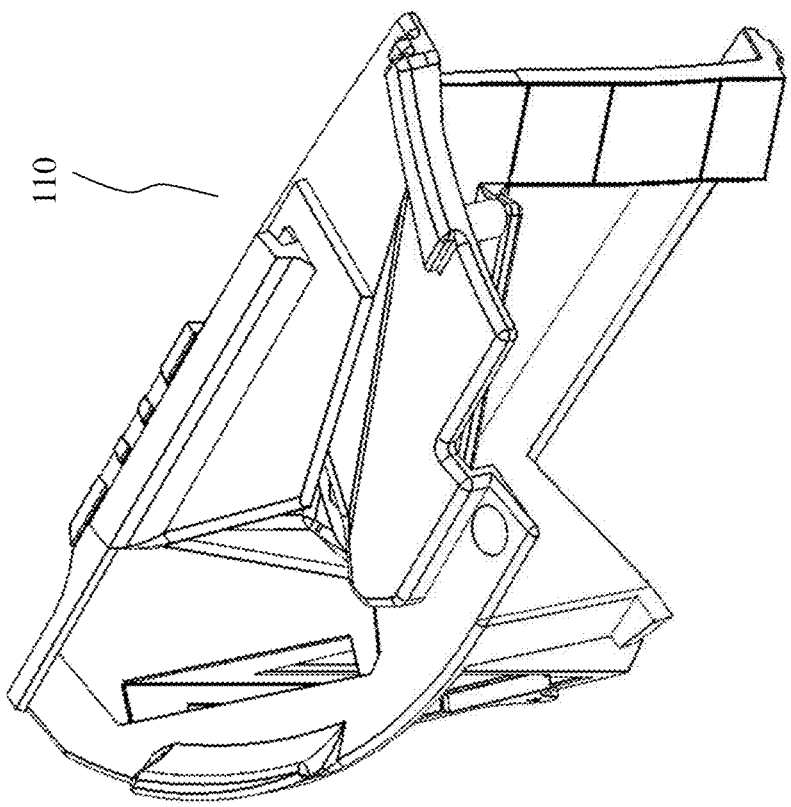
FIGS. 18A and 18B depict outer POD shells for immersive and transmissive NR2I displays respectively.
Figure 18B:
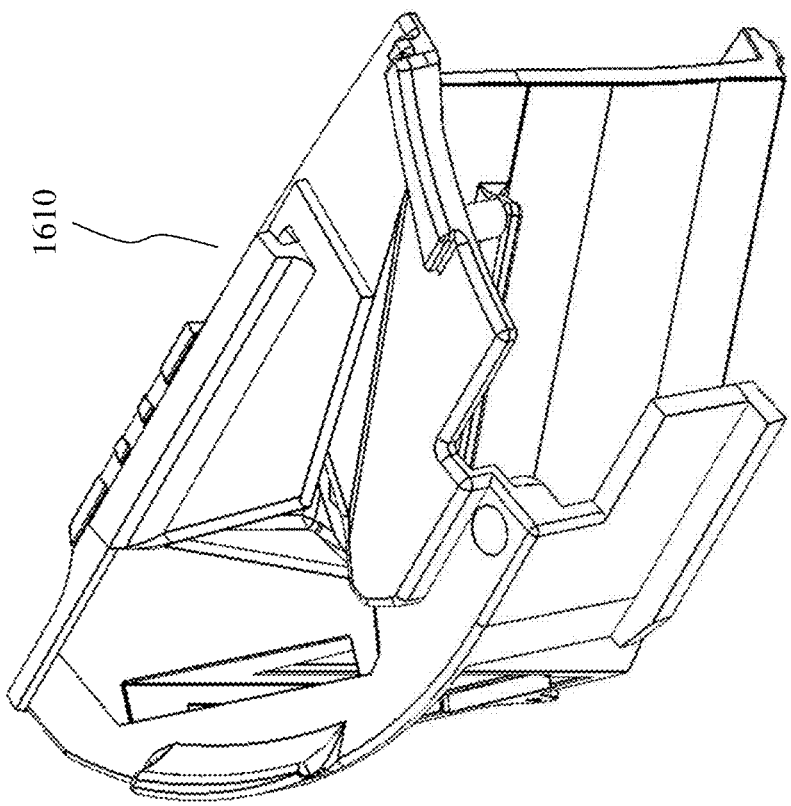

Casing 1610 as depicted in FIG. 16D is repeated as FIG. 17A. Accordingly, FIG. 17B depicts the front face of the Casing 1610 as a discrete element from the viewing perspective of the user. Accordingly, Window 1710 represents the image region within which the MicroDisplay 1620 is projected to the user's pupil via the Free-Form Prism-Lens 1630. The portion of surface S1 that is not used for display is covered by the opaque baffle 1720 in order to minimize stray light from entering surface S1, then internally reflecting and corrupting the user's perception of the image. This baffling alternately might be applied directly to surface S1 of Prism-Lens 1630 as an opaque, absorbent, silvered, or other coating. The opaque POD casing 1610 and Core 1160 are implemented so as to prevent stray light from entering other surfaces of the Prism-Lens 1630. FIGS. 17C and 17D depict cross-sections of the Casing 1610 wherein the external geometry of the Free-Form Prism Lens 1630 is evident. Arrow A depicts the region wherein the MicroDisplay 1620 is positioned. Further, referring to FIG. 18A the Casing 1610 is depicted representing an immersive shell for assembly of the MicroDisplay 1620 and Free-Form Prism Lens 1630 where the Casing 1610 has material disposed proximate the surface S2 of the Free-Form Prism Lens 1630. In contrast Mounting 1810 in FIG. 18B whilst supporting assembly of the MicroDisplay 1620 and Free-Form Prism Lens 1630 does not cover the region behind surface S2 of the Free-Form Prism Lens 1630 allowing room for the Free-Form Corrector 160 and not having material to interfere with the user's view through the Free-Form Prism Lens 1630 and Free-Form Corrector 160. When such transmissive Mounting 1810 is employed an alternate design of Core 1160 would be employed together with movement of the location of the first and second Antennae 1180 and 1190 respectively.

Figure 19A:
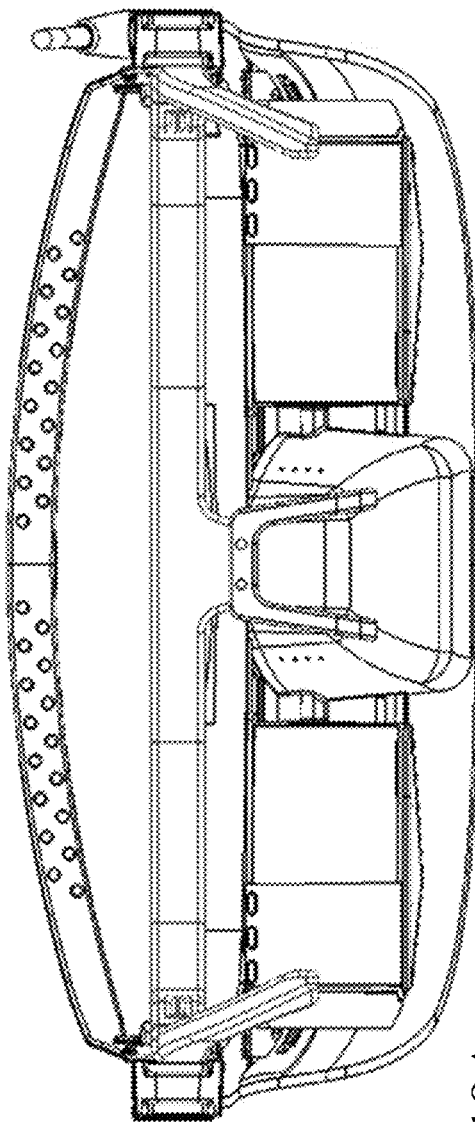
FIGS. 19A and 19B depict POD placement at maximum and minimum inter-pupil distances within an NR2I display according to an embodiment of the invention.
Figure 19B:
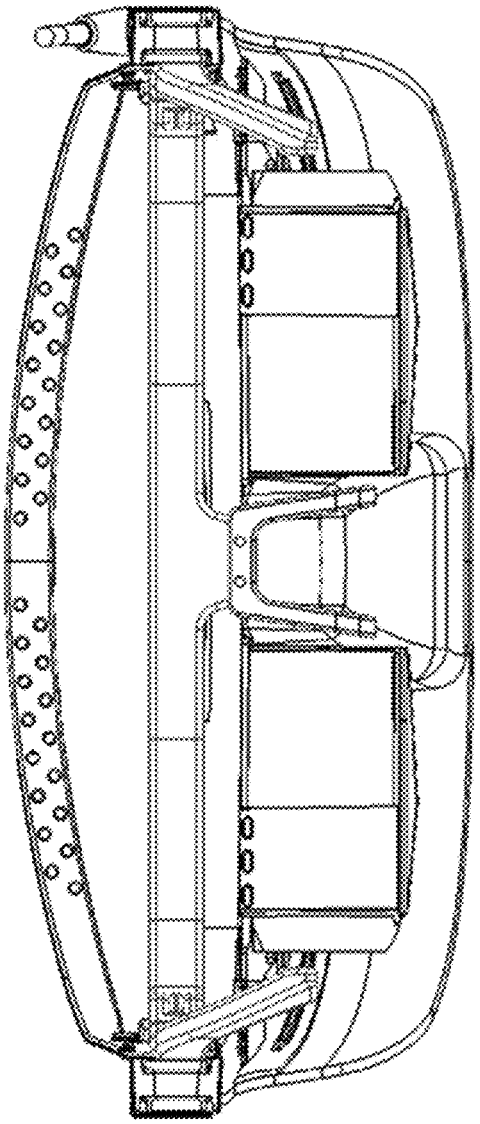

Now referring to FIGS. 19A and 19B respectively an NR2I display is presented from the user's perspective allowing the POD adjustment for display Inter-Pupil Distance (IPD) to be visualized, nominally defined as the lateral distance between the centres of the left and right viewing areas, and nominally set to match the distance between the user's pupils, although the user might choose alternate preferred locations, for instance locating the displays closer than their own IPD for consistent close-up use. Referring to FIG. 19A the PODs are depicted at their maximum IPD of approximately 70 mm (approximately 2.75 inches) where the mechanical IPD adjustment is made by sliding the PODs in and out upon their rail-shaped mounts, though any POD attachment scheme that allows lateral translation might be employed. In FIG. 19B the PODs are depicted at their minimum IPD of approximately 40 mm (approximately 1.6 inches). During initial fitting an initial or average IPD setting for the user is fixed, for example using a set-screw operating on the POD assemblies. After this fixed IPD has been set, the NR2I display electronics may further dynamically control the horizontal location of the images displayed to the user's eyes (and thus the effective display IPD) through simple digital translation of the images displayed on each of the two microdisplays. For example, to digitally increase the IPD after the PODs have been mechanically fixed the image displayed by the left POD would be digitally shifted left, and the image displayed by the right POD digitally shifted right. Iteration between digital and mechanical IPD adjustment may be employed to reduce fitting time, for example by starting from an initial factory default IPD, digitally adjusting until the user is satisfied with the setting, reading the digital IPD setting from the NR2I system, then mechanically adjusting the IPD to the digital setting as read, in order to maximize usable display area. The combination allows pixel-level IPD control. Additional micro-display pixels beyond the desired display resolution may be employed, e.g. "border" pixels which are similarly used to translate images for digital image-stabilization, or if no such information or pixels are available, suitable null data may be presented.

Figure 22:
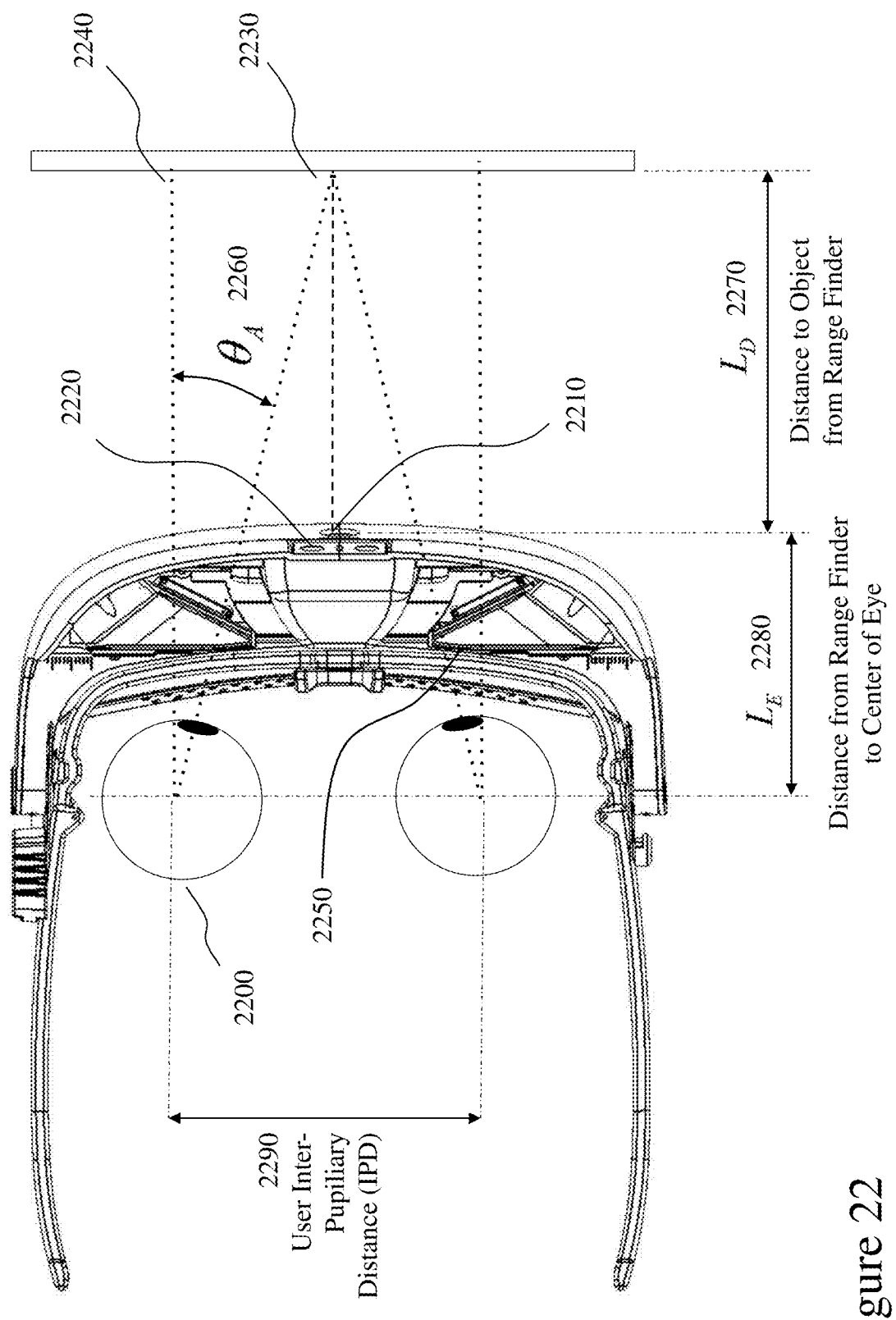
FIG. 22 depicts a top elevation view of a NR2I system depicting the effect and compensation for angular offset with varying distance of external object relative to the user.

Referring to FIG. 22, when a healthy, un-aided human eye 2200 focuses at far distant objects 2240 ("at infinity") the eyeball shape is adjusted to bring focus to infinity, and the angle $\theta_A$ 2260 of the two eyes are controlled such that the pupils are facing directly ahead, i.e. the eyes are in a parallel orientation, and $\theta_A=0$. As the object of interest moves closer towards the user, two effects occur. One is that the eyeball shape is adjusted to bring the focal-depth in from infinity to match the distance to the object, and the second is that the eyeballs are rotated towards each other so that each eyeball is aligned with the object of interest, and the eyes are no longer in a parallel position. In the limit, the user is cross-eyed staring at the bridge of their nose, and the IPD has reduced substantially as the eyes gaze turned inwards. Typical NR2I systems provide the image at a fixed focal depth of infinity, and the IPD of the images are fixed, which may result in diplopia (double-vision) or eye-strain when viewing close objects, as the eyes are not operating in a "natural" manner for close objects. Improved usability can be achieved if the electronic IPD adjustment is made dynamic, and according to the distance of the object being viewed. For NR2I systems employing a built-in camera, the auto-focus features of the image capture system may be used to direct the digital image processing system to laterally translate the images inwards towards the nose as the focus decreases from infinity. This dynamic IPD display can more accurately mimic real-world conditions and behaviours, reducing eyestrain and improving usability.

The function that relates distance to the object to the number of pixels by which to digitally offset the image may be simple or complex. Again referring to FIG. 22, a simple example might be to take distance information from the rangefinder 2220, and for distances $L_D$ 2270 less than some threshold T to laterally translate the left and right image pixels towards each other by a function of $L_D$ 2270 and T, $f(T,D)$, until a second, minimum, distance threshold is reached. A more complex example might consider the geometry of the situation as follows in order to take advantage of the small angle approximation $\sin(x) \approx x$, and $\cos(x) \approx 1$ for small x. Suppose the width of the display areas 2250 are covered by a micro-display of P pixels in width, achieving a horizontal field-of-view angle of V degrees. The small-angle approximation here is that there are P/V pixels per degree of viewing angle. Assuming a centred object 2230, the tangent of the eye-angle $\theta_A$ 2260 to the object 2230 is half the user IPD 2290 divided by the distance from the centre of the user's eye to the rangefinder, $L_E$ 2280 plus the distance from the rangefinder to the object $L_D$ 2270 as given by Equation (5). In this manner, the number of pixels to shift may be given by Equations (6) or (7) for example where $f(*)$ might be the identity function or alternatively may be one of a number of functions that threshold, limit, scale, etc.

$$\theta_A = \arctan\left(\frac{IPD}{(2\times(L_D + L_E))}\right) \quad (5)$$

$$\text{Pixels\_to\_Shift} = A \times \frac{P}{V} \quad (6)$$

$$\text{Pixels\_to\_Shift} = f\left(A \times \frac{P}{V}\right) \quad (7)$$

More complex examples still might consider off-centered objects, employ both eye tracking data and the range to the object of gaze and then shift the images asymmetrically, and/or independently for left and right eyes, and/or in the vertical orientation and/or rotational translations as well, the display dynamically responding to the user's gaze.

These image translations, either simple or complex, may be employed alone or in combination in order to minimize a visual degradation of the user, such as double-vision for example. An assistant or the user themselves may employ an input device or devices to select and adjust the translations, rotations, corrections etc. applied to improve the user's visual acuity for that particular user. These settings may be modified over time through a training program to train one or more aspects of the user's visual system, including, for example, their eye, muscles, nerves, neural processing, towards a specific objective (e.g. "lazy eye" muscle strengthening. In some instances, it may be beneficial to occlude an image continuously, periodically, randomly, presented to one or other eye, or on only portions of a presented image to allow a weaker eye and/or further neural processing to strengthen itself in a training process.

Within other embodiments of the invention such training may be invoked when the user is playing a game or performing another predetermined task or it may be continuously applied. In embodiments of the invention, the portion of an image to one or other eye may be varied over time based upon one or more factors including, for example, current activity, degree of image processing applied, and image source.

Referring to FIGS. 21A and 21B there are presented two OpenGL code samples relating to the use of independent red, green, and blue texture-maps for the correction of the chromatic aberration introduced by a freeform prism-lens according to an embodiment of the invention as depicted and discussed supra in respect of FIG. 8, and as described in detail within U.S. Provisional Patent Application 62/150,911 entitled "Methods and Devices for Optical Aberration Correction," the contents of which are incorporated herein by reference. The code snippet of FIG. 21B has been augmented relative to that of FIG. 21A by the inclusion of a lateral image-shift using the variable uXShift which can be independently programmed for left and right displays such that the effective display IPD can be varied a function of viewed-object distance, thus achieving a degree of biomimicry of the natural viewing environment. Within the embodiment described and depicted in respect of FIGS. 9 to 20 the integrated camera range-finding mechanism, depicted for example as first and second optical elements 1140 and 1150 respectively in FIG. 11, via associated electronics and processing may be employed to provide distance information to the image-processing subsystem. The induced lateral shift may be a simple function, e.g. uXShift=x/d where x is a configurable scaling parameter and d is the distance established by the NR2I display/system such as via the rangefinder. It should be evident to those skilled in the art that alternate means of range-finding, alternate functions for mapping from range to uXShift, etc. are within the scope of the invention. It would be evident to one of skill in the art that an image processing pipeline may be employed to apply the vertical translations and/or offsets, rotational translations and/or offsets, and other mappings/corrections required by the user.

It would be further evident that the NR2I may be adjusted to reflect a particular vision issue for a user in respect of this where the natural retinal motion may be different for the user in one or both eyes. With respect to the code snippet of FIG. 21B the process first checks that the lateral shift is still within the valid image area, and if not, replaces the image data with (0,0,0,1) i.e. an opaque black display. An improvement upon this black-filling approach within scope of the current invention is to provide image-sources of greater pixel-width than that of the display so that full display-width is maintained as the users eyes rotate and the display-images are shifted or panned across the source image.

3. NR2I Display, NR2I System & Partnered Devices

Figure 20:
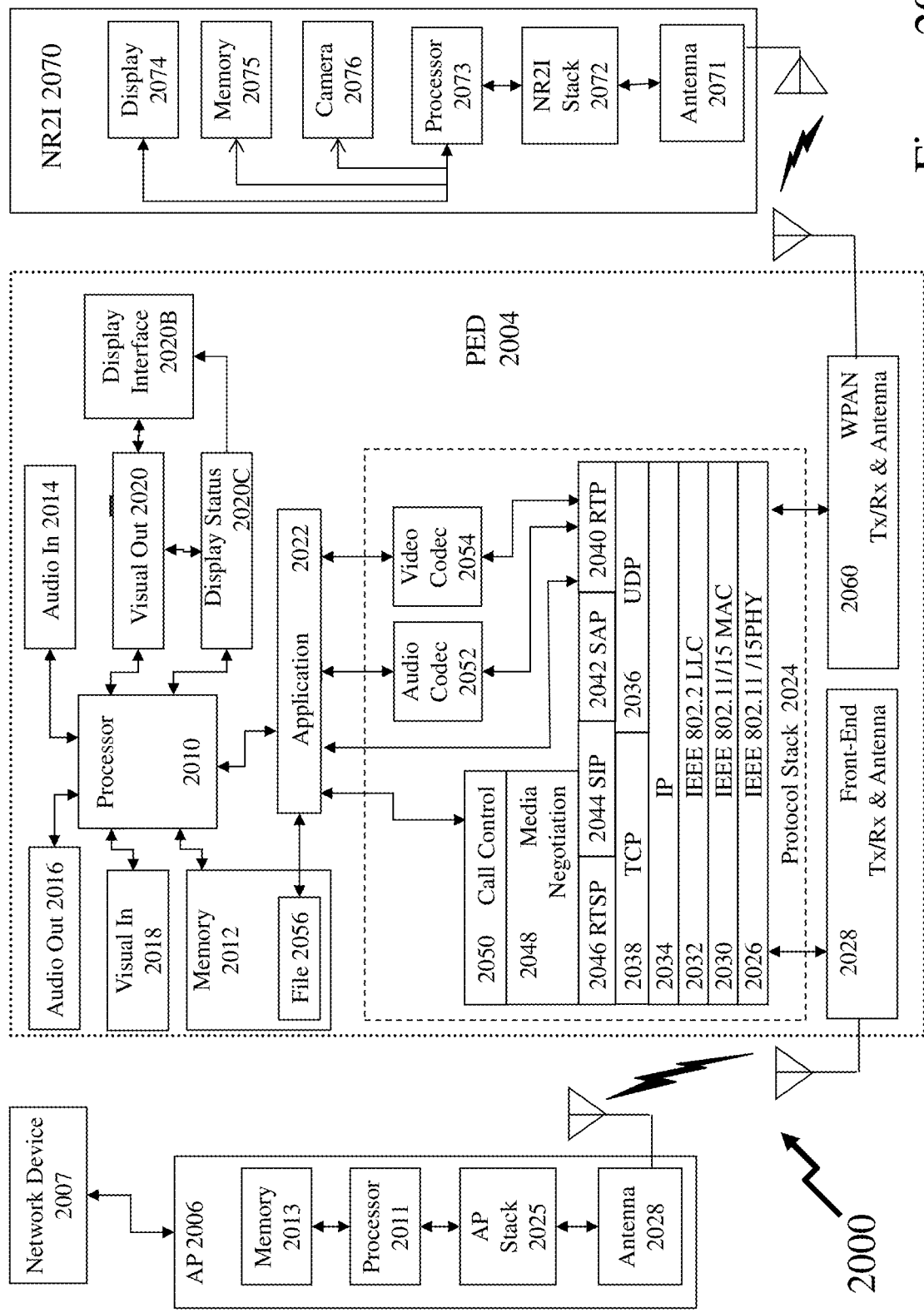
FIG. 20 depicts a portable electronic device supporting a head mounted device according to an embodiment of the invention.

Referring to FIG. 20 there is depicted a portable electronic device 2004 supporting an interface to a NR2I 2070 according to an embodiment of the invention. Also depicted within the PED 2004 is the protocol architecture as part of a simplified functional diagram of a system 2000 that includes a portable electronic device (PED) 2004, such as a smartphone, an Access Point (AP) 2006, such as a Wi-Fi access point or wireless cellular base station, and one or more network devices 2007, such as communication servers, streaming media servers, and routers for example. Network devices 2007 may be coupled to AP 2006 via any combination of networks, wired, wireless and/or optical communication. The PED 2004 includes one or more processors 2010 and a memory 2012 coupled to processor(s) 2010. AP 2006 also includes one or more processors 2011 and a memory 2013 coupled to processor(s) 2011. A non-exhaustive list of examples for any of processors 2010 and 2011 includes a central processing unit (CPU), a digital signal processor (DSP), a reduced instruction set computer (RISC), a complex instruction set computer (CISC) and the like. Furthermore, any of processors 2010 and 2011 may be part of application specific integrated circuits (ASICs) or may be a part of application specific standard products (ASSPs). A non-exhaustive list of examples for memories 2012 and 2013 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

PED 2004 may include an audio input element 2014, for example a microphone, and an audio output element 2016, for example, a speaker, coupled to any of processors 2010. PED 2004 may include a video input element 2018, for example, a video camera, and a visual output element 2020, for example an LCD display, coupled to any of processors 2010. The visual output element 2020 is also coupled to display interface 2020B and display status 2020C. PED 2004 includes one or more applications 2022 that are typically stored in memory 2012 and are executable by any combination of processors 2010. PED 2004 includes a protocol stack 2024 and AP 2006 includes a communication stack 2025. Within system 2000 protocol stack 2024 is shown as IEEE 802.11/15 protocol stack but alternatively may exploit other protocol stacks such as an Internet Engineering Task Force (IETF) multimedia protocol stack for example. Likewise, AP stack 2025 exploits a protocol stack but is not expanded for clarity. Elements of protocol stack 2024 and AP stack 2025 may be implemented in any combination of software, firmware and/or hardware. Protocol stack 2024 includes an IEEE 802.11/15-compatible PHY module 2026 that is coupled to one or more Front-End Tx/Rx & Antenna 2028, an IEEE 802.11/15-compatible MAC module 2030 coupled to an IEEE 802.2-compatible LLC module 2032. Protocol stack 2024 includes a network layer IP module 2034, a transport layer User Datagram Protocol (UDP) module 2036 and a transport layer Transmission Control Protocol (TCP) module 2038. Also shown is WPAN Tx/Rx & Antenna 2060, for example supporting IEEE 802.15.

Protocol stack 2024 also includes a session layer Real Time Transport Protocol (RTP) module 2040, a Session Announcement Protocol (SAP) module 2042, a Session Initiation Protocol (SIP) module 2044 and a Real Time Streaming Protocol (RTSP) module 2046. Protocol stack 2024 includes a presentation layer media negotiation module 2048, a call control module 2050, one or more audio codecs 2052 and one or more video codecs 2054. Applications 2022 may be able to create maintain and/or terminate communication sessions with any of devices 2007 by way of AP 2006. Typically, applications 2022 may activate any of the SAP, SIP, RTSP, media negotiation and call control modules for that purpose. Typically, information may propagate from the SAP, SIP, RTSP, media negotiation and call control modules to PHY module 2026 through TCP module 2038, IP module 2034, LLC module 2032 and MAC module 2030.

It would be apparent to one skilled in the art that elements of the PED 2004 may also be implemented within the AP 2006 including but not limited to one or more elements of the protocol stack 2024, including for example an IEEE 802.11-compatible PHY module, an IEEE 802.11-compatible MAC module, and an IEEE 802.2-compatible LLC module 2032. The AP 2006 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Also depicted is NR2I 2070 which is coupled to the PED 2004 through WPAN interface between Antenna 2071 and WPAN Tx/Rx & Antenna 2060. Antenna 2071 is connected to NR2I Stack 2072 and therein to processor 2073. Processor 2073 is coupled to camera 2076, memory 2075, and display 2074. NR2I 2070 being for example NR2I 370 described above in respect of FIG. 3. Accordingly, NR2I 2070 may, for example, utilize the processor 2010 within PED 2004 for processing functionality such that a lower power processor 2073 is deployed within NR2I 2070 controlling acquisition of image data from camera 2076 and presentation of modified image data to user via display 2074 with instruction sets and some algorithms for example stored within the memory 2075. It would be evident that data relating to the particular individual's visual defects may be stored within memory 2012 of PED 2004 and/or memory 2075 of NR2I 2070. This information may be remotely transferred to the PED 2004 and/or NR2I 2070 from a remote system such as an optometry system characterising the individual's visual defects via Network Device 2007 and AP 2006. For example, the eSight Generation 3 NR2I supports a wired USB connection to the PED/FED as well as a Bluetooth connection. Accordingly, a Wi-Fi connection to the NR2I 2070 would be via the PED/FED and either the Bluetooth or wired connection.

Optionally, the processing of image data may be solely within the NR2I 2070, solely within the PED 2004, distributed between them, capable of executed independently upon both, or dynamically allocated according to constraints such as processor loading, battery status etc. Accordingly, the image acquired from a camera associated with the NR2I 2070 may be processed by the NR2I 2070 directly but image data to be displayed acquired from an external source processed by the PED 2004 for combination with that provided by the NR2I 2070 or in replacement thereof. Optionally, processing within the NR2I 2070 may be off-loaded to the PED 2004 during instances of low battery of the NR2I 2070, for example, wherein the user may also be advised to make an electrical connection between the NR2I 2070 and PED 20040 in order to remove power drain from the Bluetooth interface or another local PAN etc.

Accordingly, it would be evident to one skilled the art that the NR2I with associated PED may accordingly download original software and/or revisions for a variety of functions including diagnostics, display image generation, and image processing algorithms as well as revised ophthalmic data relating to the individual's eye or eyes. Accordingly, it is possible to conceive of a single generic NR2I being manufactured that is then configured to the individual through software and patient ophthalmic data. Optionally, the elements of the PED required for network interfacing via a wireless network (where implemented), NR2I interfacing through a WPAN protocol, processor, etc. may be implemented in a discrete standalone PED as opposed to exploiting a consumer PED. A PED such as described in respect of FIG. 20 allows the user to adapt the algorithms employed through selection from internal memory as well as define an ROI through a touchscreen, touchpad, or keypad interface for example.

Further the user interface on the PED may be context aware such that the user is provided with different interfaces, software options, and configurations for example based upon factors including but not limited to cellular tower accessed, Wi-Fi/WiMAX transceiver connection, GPS location, and local associated devices. Accordingly, the NR2I may be reconfigured upon the determined context of the user based upon the PED determined context. Optionally, the NR2I may determine the context itself based upon any of the preceding techniques where such features are part of the NR2I configuration as well as based upon processing the received image from the camera. For example, the NR2I configuration for the user wherein the context is sitting watching television based upon processing the image from the camera may be different to that determined when the user is reading, walking, driving etc. In some instances, the determined context may be overridden by the user such as, for example, the NR2I associates with the Bluetooth interface of the user's vehicle but in this instance the user is a passenger rather than the driver.

It would be evident to one skilled in the art that in some circumstances the user may elect to load a different image processing algorithm and/or NR2I application as opposed to those provided with the NR2I. For example, a third party vendor may offer an algorithm not offered by the NR2I vendor or the NR2I vendor may approve third party vendors to develop algorithms addressing particular requirements. For example, a third party vendor may develop an information sign set for the Japan, China etc. whereas another third party vendor may provide this for Europe.

Optionally the NR2I can also present visual content to the user which has been sourced from an electronic device, such as a television, computer display, multimedia player, gaming console, personal video recorder (PVR), or cable network set-top box for example. This electronic content may be transmitted wirelessly for example to the NR2I directly or via a PED to which the NR2I is interfaced. Alternatively, the electronic content may be sourced through a wired interface such as USB, I2C, RS485, etc. as discussed above. In the instances that the content is sourced from an electronic device, such as a television, computer display, multimedia player, gaming console, personal video recorder (PVR), or cable network set-top box for example then the configuration of the NR2I may be common to multiple electronic devices and their "normal" world engagement or the configuration of the NR2I for their "normal" world engagement and the electronic devices may be different. These differences may for example be different processing variable values for a common algorithm or it may be different algorithms.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Such variations and modifications of the embodiments described herein includes that specific dimensions, variables, scaling factors, ratios, etc. may be varied within different limits or that these may be approximate rather than absolute.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A near-to-eye (NR2I) display system comprising:
a body of the NR2I system;
a first assembly comprising:
a first casing;
a first free-form prism lens, and
a first microdisplay for projecting image-light onto a predetermined region of a first surface of said first free-form prism-lens, said image light performing two internal reflections within the first free-form prism-lens before exiting the first free-form prism-lens for viewing by the user with an eye, wherein
the first microdisplay and the first free-form lens are each fixedly attached to the first casing;
the first microdisplay is fixedly positioned at a predetermined position relative to said first surface of the first free-form prism lens;
the first microdisplay and first free-form prism lens together present an image to the user which has a field-of-view in a horizontal axis defined from a left side of a head of the user to a right side of the head of the user is greater than a field-of-view in a vertical axis defined from a top of the head of the user to a bottom of the head of the user;
the first assembly is attached to the body of the NR2I system such that the first microdisplay and first free-form prism lens are disposed laterally along the horizontal axis;
the first surface of the first free-form prism lens is a surface of the first free-form lens towards the first micro-display;
the two internal reflections within the first free-form prism lens occur along the horizontal axis;
the first assembly is fixed in position within the body of the NR2I display system;
the images upon the first microdisplay are shifted by at least one of:
a horizontal translation in combination with a vertical translation;
a rotational translation; and
a vertical translation;
a magnitude of the shift is established in dependence upon range-finding data to an object of gaze of the user;
the object of gaze of the user is established solely in dependence upon the image displayed upon the first microdisplay and a gaze direction of the user with respect to the displayed image; and
the gaze direction of the user is established through eye-tracking of the eye of the user to which the first assembly is aligned.

2. The NR2I display system according to claim 1, wherein
the first assembly has first attachment features such that lateral motion of the first assembly across the user's horizontal field of view when attached to the body of the NR2I system is made possible prior to fixing the first assembly into position when the first assembly is aligned to an eye of the user; and
lateral motion of the first assembly maintains the first microdisplay at the predetermined position relative to the first surface of the first free-form prism lens since the first microdisplay and the first free-form lens are each fixedly attached to the first casing of the first assembly.

3. The NR2I display system according to claim 1, wherein
a remainder of a second surface of the first free-form prism lens has a coating applied to block light transmitted through the first free-form prism lens wherein the remainder of the second surface of the first free-form prism-lens is defined as the second surface of free-form prism lens minus a predetermined region of the second surface and the predetermined region is defined as that portion of the second surface of the first-free form lens from which the image-light from the first microdisplay exits towards the eye of the user; and
the second surface of the first free-form prism lens is disposed towards the eye of the user.

4. The NR2I display system according to claim 1, wherein
a final design of the first free-form prism-lens is established in dependence upon a plurality of design simulations of the first free-form prism lens;
each design simulation of the plurality of design simulations is performed at a predetermined wavelength of a plurality of predetermined wavelengths; and each predetermined wavelength of the plurality of predetermined wavelengths is associated with a specific colour pixel within the first microdisplay.

5. The NR2I display system according to claim 1, wherein a remainder of a second free-form surface of the free-form prism lens has a coating applied to block light transmitted through the free-form prism lens wherein the remainder of the second free-form surface of the free-form prism-lens is defined as the second free-form surface of free-form prism lens minus a predetermined region of the second free-form surface and the predetermined region is defined as that portion of the second free-form surface of the free-form prism lens from which the image-light from the microdisplay exits towards the eye of the user; and the second free-form surface of the free-form prism lens is disposed towards the eye of the user.

6. A near-to-eye (NR2I) display system comprising:
a body of the NR2I system;
a assembly comprising:
   a casing;
   a free-form prism lens comprising:
      a first free-form surface configured to receive light from a micro-display and transmit the received light into the body of the free-form prism-lens;
      a second free-form surface configured to receive the light transmitted into the body of the free-form prism-lens from the first free-form surface and configured to reflect the received light at the second free-form surface; and
      a third free-form surface configured to receive the light reflected by the second free-form surface and to at least partially reflect the light back towards the second free-form surface and then out of the prism-lens; and
   a microdisplay for projecting image-light onto a predetermined region of the first free-form surface of said free-form prism-lens; wherein
the microdisplay and the free-form lens are each fixedly attached to the casing;
the microdisplay is fixedly positioned at a predetermined position relative to said first surface of the free-form prism lens;
the reflection at the second free-form surface and the at least partial reflection at the third free-form surface occur within a selected folding plane;
the microdisplay and free-form prism lens are disposed laterally along a horizontal axis defined from a left side of a head of the user to a right side of the head of the user;
the selected folding plane is the horizontal axis; and
the NR2I display systems has a field of view in the folding plane greater than another field of view in a plane perpendicular to the folding plane;
the assembly is fixed in position within the body of the NR2I display system;
the images upon the microdisplay are shifted by at least one of:
   a horizontal translation in combination with a vertical translation;
   a rotational translation; and
   a vertical translation;
a magnitude of the shift is established in dependence upon range-finding data to an object of gaze of the user;
the object of gaze of the user is established solely in dependence upon the image displayed upon the first microdisplay and a gaze direction of the user with respect to the displayed image; and the gaze direction of the user is established through eye-tracking of the eye of the user to which the assembly is aligned.

7. The NR2I display system according to claim 6, wherein the second free-form surface of the free-form prism-lens is configured to internally reflect over a first portion of the second free-form surface light from the microdisplay entering the prism-lens through the first free-form surface towards a third free-form surface of the free-form prism-lens and is configured to transmit over a second portion of the second free-form surface light reflected from the third free-form surface towards the user's eyes;

a sub-portion of the first portion of the second free-form surface of the free-form prism-lens that does not overlap the second portion of the second free-form surface of the free-form prism-lens is at least one of:
   coated with a reflective material; and
   coated with a material to block external light entering the freeform prism; and
the second free-form surface of the free-form prism lens is disposed towards the eye of the user.

8. A near-to-eye (NR2I) display system comprising:
a body of the NR2I system;
an assembly comprising:
   a casing;
   a free-form prism lens comprising:
      a first free-form surface configured to receive light from a micro-display and transmit the received light into the body of the free-form prism-lens;
      a second free-form surface configured to receive the light transmitted into the body of the free-form prism-lens from the first free-form surface and configured to reflect the received light at the second free-form surface; and
      a third free-form surface configured to receive the light reflected by the second free-form surface and to at least partially reflect the light back towards the second free-form surface and then out of the prism-lens; and
a microdisplay for projecting image-light onto a predetermined region of the first free-form surface of said free-form prism-lens;
wherein the microdisplay and the free-form lens are each fixedly attached to the casing;
the microdisplay is fixedly positioned at a predetermined position relative to said first surface of the free-form prism lens;
the reflection at the second free-form surface and the at least partial reflection at the third free-form surface occur within a selected folding plane;
the microdisplay and free-form prism lens are disposed laterally along a horizontal axis defined from a left side of a head of the user to a right side of the head of the user;
the selected folding plane is the horizontal axis;
the NR2I display systems has a field of view in the folding plane greater than another field of view in a plane perpendicular to the folding plane;
a spatial distortion at a maximum field angle of the free-form prism lens is less than 10% the assembly is fixed in position within the body of the NR2I display system;

the images upon the microdisplay are shifted by at least one of:
  a horizontal translation in combination with a vertical translation,
  a rotational translation; and
  a vertical translation;
a magnitude of the shift is established in dependence upon range-finding data to an object of gaze of the user;
the object of gaze of the user is established solely in dependence upon the image displayed upon the microdisplay and a gaze direction of the user with respect to the displayed image; and
the gaze direction of the user is established through eye-tracking of the eye of the user to which the assembly is aligned.

9. The NR2I display system according to claim 8, wherein
the second free-form surface of the free-form prism-lens is configured to internally reflect over a first portion of the second surface light from the microdisplay entering the prism-lens through the first free-form surface towards a third free-form surface of the free-form prism-lens and is configured to transmit over a second portion of the second free-form surface light reflected from the third free-form surface towards the user's eyes;
a sub-portion of the first portion of the second free-form surface of the free-form prism-lens that does not overlap the second portion of the second free-form surface of the free-form prism-lens is at least one of:
  coated with a reflective material; and
  coated with a material to block external light entering the freeform prism; and
the second free-form surface of the free-form prism lens is disposed towards the eye of the user.

10. The NR2I display system according to claim 8, wherein
a remainder of a second free-form surface of the free-form prism lens has a coating applied to block light transmitted through the free-form prism lens wherein the remainder of the second free-form surface of the free-form prism-lens is defined as the second free-form surface of free-form prism lens minus a predetermined region of the second free-form surface and the predetermined region is defined as that portion of the second free-form surface of the free-form prism lens from which the image-light from the microdisplay exits towards the eye of the user; and
the second free-form surface of the free-form prism lens is disposed towards the eye of the user.

11. A near-to-eye (NR2I) display system comprising:
a body of the NR2I system;
an assembly comprising:
  a casing;
  a prism lens; and
  a microdisplay for projecting image-light onto a predetermined region of a surface of said prism-lens;
wherein images upon the microdisplay are coupled to an eye of a user via the prism lens;
the microdisplay and the lens are each fixedly attached to the casing;
the microdisplay is fixedly positioned at a predetermined position relative to said surface of the prism lens;
the assembly is fixed in position within the body of the NR2I display system;
the images upon the microdisplay are shifted by at least one of:
  a horizontal translation in combination with a vertical translation;
  a rotational translation; and
  a vertical translation;
a magnitude of the shift is established in dependence upon range-finding data to an object of gaze of the user;
the object of gaze of the user is established solely in dependence upon the image displayed upon the microdisplay and a gaze direction of the user with respect to the displayed image; and
the gaze direction of the user is established through eye-tracking of the eye of the user to which the assembly is aligned.

\* \* \* \* \*